US012719173B2

(12) United States Patent
Leung et al.

(10) Patent No.: US 12,719,173 B2
(45) Date of Patent: Aug. 25, 2026

(54) MULTI-SLOT ANTENNA AND LOW-PROFILE PHASED ARRAY ANTENNA USING THE SAME

(71) Applicant: City University of Hong Kong, Hong Kong (HK)

(72) Inventors: Kwok Wa Leung, Hong Kong (HK); Zhili Su, Hong Kong (HK); Kai Lu, Guangzhou (CN)

(73) Assignee: City University of Hong Kong, Hong Kong (HK)

(*) Notice: Subject to any disclaimer, the term of this patent is extended or adjusted under 35 U.S.C. 154(b) by 170 days.

(21) Appl. No.: 18/610,305

(22) Filed: Mar. 20, 2024

(65) Prior Publication Data

US 2025/0300358 A1 Sep. 25, 2025

(51) Int. Cl.

*H01Q 13/10* (2006.01)
*H01Q 1/32* (2006.01)
*H01Q 5/385* (2015.01)
*H01Q 13/16* (2006.01)
(Continued)

(52) U.S. Cl.

CPC ......... *H01Q 13/103* (2013.01); *H01Q 1/3275* (2013.01); *H01Q 5/385* (2015.01); *H01Q 13/10* (2013.01); *H01Q 13/16* (2013.01); *H01Q 21/00* (2013.01); *H01Q 21/064* (2013.01)

(58) Field of Classification Search

CPC ........ H01Q 13/103; H01Q 5/385; H01Q 3/26; H01Q 13/10; H01Q 13/16; H01Q 21/0075; H01Q 21/064; H01Q 1/3275
See application file for complete search history.

(56) References Cited

U.S. PATENT DOCUMENTS 11,264,733 B2 3/2022 Lahav et al.
11,677,161 B1 * 6/2023 Tabatabai ............ H01Q 21/065 343/702
(Continued)

FOREIGN PATENT DOCUMENTS

CN 113871865 A 12/2021
CN 114361783 A 4/2022

OTHER PUBLICATIONS

Le Liang et al., "Vehicular Communications: A Physical Layer Perspective," IEEE Transactions on Vehicular Technology, 2017, vol. 66 (12), p. 10647-10659.
(Continued)

*Primary Examiner* — Dameon E Levi
*Assistant Examiner* — Yonchan J Kim
(74) *Attorney, Agent, or Firm* — Idea Intellectual Limited; Sam T. Yip

(57) ABSTRACT

A multi-slot antenna includes a ground plane, a driven slot, a first parasitic slot, a second parasitic slot, a third parasitic slot, and a fourth parasitic slot. The driven slot is positioned on the ground plane and extends along a first direction. The first, second, third, fourth parasitic slots are positioned on the ground plane, and each of them extends along the first direction and a second direction different than the first direction. The first parasitic slot and the third parasitic slot symmetrical about the driven slot. The fourth parasitic slot is positioned on the ground plane and at the second side of the driven slot. The second parasitic slot and the fourth parasitic slot are symmetrical about the driven slot.

19 Claims, 20 Drawing Sheets

(51) Int. Cl.
*H01Q 21/00* (2006.01)
*H01Q 21/06* (2006.01)

(56) References Cited

U.S. PATENT DOCUMENTS

| | | | | |
|---|---|---|---|---|
| 2008/0062063 | A1* | 3/2008 | Matsushita | H01Q 21/24 343/846 |
| 2008/0284670 | A1* | 11/2008 | Kanno | H01Q 13/106 343/767 |
| 2009/0153412 | A1* | 6/2009 | Chiang | H01Q 1/52 343/702 |
| 2012/0092224 | A1* | 4/2012 | Sauleau | H01Q 21/005 343/771 |
| 2023/0019565 | A1 | 1/2023 | Evtyushkin et al. | |
| 2023/0104894 | A1 | 4/2023 | Adams et al. | |

OTHER PUBLICATIONS

Zhihong Tian et al., "Evaluating Reputation Management Schemes of Internet of Vehicles Based on Evolutionary Game Theory," IEEE Transactions on Vehicular Technology, 2019, vol. 68 (6), p. 5971-5980.
Ao Li et al., "Single-Layer Wideband End-Fire Dual-Polarized Antenna Array for Device-to-Device Communication in 5G Wireless Systems," IEEE Transactions on Vehicular Technology, 2020, vol. 69 (5), p. 5142-5150.
Yu-Xiang Sun et al., "Compact Dual Microwave/Millimeter-Wave Planar Shared-Aperture Antenna for Vehicle-to- Vehicle/5G Communications," IEEE Transactions on Vehicular Technology, 2021, vol. 70 (5), p. 5071-5076.
Guang-Wei Yang et al., "A Dual-Band Shared-Aperture Antenna With Wide-Angle Scanning Capability for Mobile System Applications, " IEEE Transactions on Vehicular Technology, 2021, vol. 70 (5), p. 4088-4097.
Bing Jie Xiang et al., "A Wideband 2-Bit Transmitarray Antenna for Millimeter-Wave Vehicular Communication," IEEE Transactions on Vehicular Technology, 2022, vol. 71 (9), p. 9202-9211.
Jianfeng Zhu et al., "Dual-Band Dual Circularly Polarized Antenna Array Using FSS-Integrated Polarization Rotation AMC Ground for Vehicle Satellite Communications," IEEE Transactions on Vehicular Technology, 2019, vol. 68 (11), p. 10742-10751.
Zhen-Xing Xia et al., "3-D-Printed Wideband High-Efficiency Dual-Frequency Antenna for Vehicular Communications," IEEE Transactions on Vehicular Technology, 2022, vol. 71 (4), p. 3457-3469.
Tadilo Endeshaw Bogale et al., "Adaptive Channel Prediction, Beamforming and Scheduling Design for 5G V21 Network: Analytical and Machine Learning Approaches," IEEE Transactions on Vehicular Technology, 2020, vol. 69 (5), p. 5055-5067.
Chao Jun Ma et al., "A Miniaturized Planar Multibeam Antenna for Millimeter-Wave Vehicular Communication," IEEE Transactions on Vehicular Technology, 2023, vol. 72 (3), p. 3611-3621.
Robert C. Hansen, "Phased Array Antennas, 2nd Edition," Wiley 2009, p. 1-571.
Robert J. Mailloux, "Phased Array Antenna Handbook, Third Edition," Artech House, 2017, p. 1-549.
Bing Zhang et al., "Design of Dielectric Resonator Antenna Array With Wide-Angle Scanning Based on Dual Magnetic Currents," IEEE Transactions on Antennas and Propagation, 2022, vol. 70 (12), p. 11675-11685.
Zhi-Li Su et al., "A Shaped-Beam Antenna for Wide-Angle Scanning Phased Array," IEEE Transactions on Antennas and Propagation, 2022, vol. 70 (9), p. 7659-7669.
Xiao Ding et al., "A Wide-Angle Scanning Phased Array With Microstrip Patch Mode Reconfiguration Technique," IEEE Transactions on Antennas and Propagation, 2017, vol. 65 (9), p. 4548-4555.
You-Feng Cheng et al., "A Novel Wide-Angle Scanning Phased Array Based on Dual-Mode Pattern-Reconfigurable Elements," IEEE Antennas and Wireless Propagation Letters, 2017, vol. 16, p. 396-399.
Zhijiao Chen et al., "A Compact Phase-Controlled Pattern-Reconfigurable Dielectric Resonator Antenna for Passive Wide-Angle Beam Scanning," IEEE Transactions on Antennas and Propagation, 2021, vol. 69 (5), p. 2981-2986.
Kun Wang et al., "A Novel Low-Profile Phased Antenna With Dual-Port and Its Application in 1-D Linear Array to 2-D Scanning," IEEE Transactions on Antennas and Propagation, 2022, vol. 70 (8), p. 6718-6731.
Mei Li et al., "Investigation of Using High Impedance Surfaces for Wide-Angle Scanning Arrays," IEEE Transactions on Antennas and Propagation, 2015, vol. 63 (7), p. 2895-2901.
Ren Wang et al., "Planar Phased Array With Wide-Angle Scanning Performance Based on Image Theory," IEEE Transactions on Antennas and Propagation, 2015, vol. 63 (9), p. 3908-3917.
Xiao Ding et al., "A Planar Wide-Angle Scanning Phased Array With X-, Ku-, and K-Band RCS Reduction," IEEE Transactions on Antennas and Propagation, 2020, vol. 68 (5), p. 4103-4108.
Yan Li et al., "Wideband Wide-Angle Scanning Phased Array Based on Miniaturized Metasurface Antenna," IEEE Transactions on Antennas and Propagation, 2022, vol. 70, (2), p. 1107-1119.
Chun-Mei Liu et al., "Wide-Angle Scanning Low Profile Phased Array Antenna Based on a Novel Magnetic Dipole," IEEE Transactions on Antennas and Propagation, 2017, vol. 65, (3), p. 1151-1162.
Ye-Bon Kim et al., "Compact Planar Multipole Antenna for Scalable Wide Beamwidth and Bandwidth Characteristics," IEEE Transactions on Antennas and Propagation, 2020, vol. 68 (5), p. 3433-3442.
Ye-Bon Kim et al., "Electrically Conformal Antenna Array With Planar Multipole Structure for 2-D Wide Angle Beam Steering," IEEE Access, 2020, vol. 8, p. 157261-157269.
Yong-Mei Pan et al., "Compact Quasi-Isotropic Dielectric Resonator Antenna With Small Ground Plane," IEEE Transactions on Antennas and Propagation, 2014, vol. 62 (2), p. 577-585.
D. M. Pozar, "The Active Element Pattern," IEEE Transactions on Antennas and Propagation, 1994, vol. 42 (8), p. 1176-1178.
Constantine A. Balanis, "Antenna Theory: Analysis and Design, 3rd Edition," Wiley-Interscience, 2005, p. 1-1073.
David F. Kelley et al., "Array Antenna Pattern Modeling Methods That Include Mutual Coupling Effects," IEEE Transactions on Antennas and Propagation, 1993, vol. 41 (12), p. 1625-1632.
Warren L. Stutzman et al., "Antenna Theory and Design 3rd Edition," Wiley, 2012, p. 1-843.

* cited by examiner (a)

(b)

200

200

(a)

(b)

(c)

TABLE
Comparison With Other Reported Wide-angle Beam-Steering Linear Phased Arrays

| Ref. | Antenna type | Bandwidth (%) | Scanning range | Gain fluctuation (dB) | Peak SLL (dB) | Technique | Complexity | Profile ($\lambda_0$*) | Planar | PCB substrate layer |
|---|---|---|---|---|---|---|---|---|---|---|
| Prior art device A | Patch | 9.3 | ±60° | 3 | -10 | Hybrid modes | Moderate | 0.250 | No | / |
| Prior art device B | DRA | 5.5 | ±85° | 2.5 | -10 | Hybrid modes | Moderate | 0.455 | No | / |
| Prior art device C | DRA | 5.2 | ±72° | 0.9 | -6.9 | Parasitic loading | Low | 0.628 | No | / |
| Prior art device D | Patch | ~1.1 | ±81° | 2.6 | -7.7 | Pattern reconfiguration | High | 0.062 | Yes | Multiple |
| Prior art device E | DRA | 3.3 | ±81° | 1.25 | -6.8 | Pattern reconfiguration | Moderate | 0.235 | No | / |
| Prior art device F | Wire | ~5.2 | ±85° | 3 | -10 | High impedance surface | Moderate | 0.050 | Yes | Multiple |
| Prior art device G | Slot | ~3.7 | ±70° | 1.5 | -5.9 | Cavity-backed slot | High | 0.144 | Yes | Multiple |
| Prior art device H | Microstrip | 4.7 | ±76° | 3 | -9 | Equivalent magnetic current | Low | 0.029 | Yes | Single |
| Prior art device I | Patch (Type A) | 2.1 | -78° to 77° | 3 | -10 | Multipole dipole | Low | 0.022 | Yes | Single |
| | Patch (Type B) | 11.7 | -74° to 70° | 3 | -10 | Multipole dipole | Low | 0.022 | Yes | Single |
| The device of the present invention | Slot | 4.4 | ±90° | 2.1 | -5 | Hybrid magnetic currents | Low | 0.023 | Yes | Single |

*$\lambda_0$: *free space wavelength at center frequency.*

FIG. 20

MULTI-SLOT ANTENNA AND LOW-PROFILE PHASED ARRAY ANTENNA USING THE SAME

TECHNICAL FIELD

The present invention relates to communication technologies; and more particularly to multi-slot antennas and low-profile phased array antennas using the same for wide steering range in communication.

BACKGROUND

With the rapid development of the intelligent transportation system, vehicle-to-everything (V2X) communications have gained strong attention from both industry and academia. The V2X technology is used to facilitate a wide range of wireless communications between different devices, including vehicle-to-vehicle (V2V), vehicle-to-network (V2N), and vehicle-to-infrastructure (V2I). An antenna serves as a vital component for transmitting and receiving electromagnetic (EM) waves in a wireless communication system. Its performance influences the communication quality and stability significantly.

FIG. 1 shows the application scenario of a vehicle-mounted antenna for V2X communications. Since the relative position between the vehicles and devices will vary quickly, it is important for the antenna mounted on the vehicle to possess an agile beam-steering capability, enabling a reliable and real-time connectivity for the V2X system. As compared with the conventional fixed-beam antenna, the beam-steering antenna generally has a higher spatial resolution and longer communication range. It is common to obtain the agile beam-steering capability by using a phased array antenna.

A conventional phased array antenna usually exhibits a limited scanning range due to the considerable gain loss especially at large angles. It is mainly caused by the strong mutual couplings between antenna elements and narrow beamwidth of element radiation pattern. Therefore, developing a broad-beam antenna element is an effective strategy for expanding the scanning range. There are various techniques that have been investigated to obtain broad-beam antenna elements. For example, a broad beamwidth can be achieved by merging different resonant modes with complementary radiation pattern. In some related references, two metallic strips are added beside the high-frequency patch antenna to enhance low-elevation radiation with vertical currents of the strips. In some related references, two suspended equivalent magnetic currents are added to obtain a radiation pattern complementary to the original broadside pattern. Recently, a broad-beam dielectric resonator antenna (DRA) has been designed by incorporating a metal and dielectric loading. However, all the wide-beam designs mentioned above have a high profile.

Apart from a static broad beam, a dynamic reconfigurable broad beam is also useful in phased array antenna designs. The different patterns of a reconfigurable design can jointly provide a wider scan range. In some related references, PIN diodes have been used to switch between two resonant modes of a patch with complementary radiation patterns. Alternatively, a two-port DRA has been studied to obtain a pattern reconfigurable design manipulating the phase of the two ports. However, employing the pattern-reconfigurable technique will inevitably lead to the increase of the design complexity and its associated costs. Also, the overall profile of a pattern-reconfigurable antenna is usually high.

In vehicular communications, a low-profile antenna is usually desired to reduce wind resistance. Low-profile horizontal dipole antennas with wide H-plane beamwidths can be obtained by placing a high-impedance surface (HIS) or an artificial magnetic conductor (AMC) below the dipoles. When using a radiating slot or an equivalent magnetic dipole as the primary radiator, the low-profile feature can be kept by using an ordinary metal reflector or a simple metasurface. However, this kind of designs is usually realized with multi-layer printed circuit boards (PCBs), undesirably increasing the design cost and complexity. A wide-angle scanning design using a single-substrate microstrip antenna was also investigated. Planar wide-beam multipole antennas based on single substrate were studied in related references. These multipole antennas were further utilized as the elements to build phased arrays with wide beam-steering characteristics. Some of array designs may present simple structures, but their performances are not as good as expected.

Therefore, there is a need to develop a phased array design for vehicular communications that is both low-cost and low-profile while maintaining competitive beam scanning performance.

SUMMARY OF INVENTION

It is an objective of the present invention to provide devices and methods to address the aforementioned shortcomings and unmet needs in the state of the art.

In accordance with a first aspect of the present invention, a multi-slot antenna is provided. The multi-slot antenna includes a ground plane, a driven slot, a first parasitic slot, a second parasitic slot, a third parasitic slot, and a fourth parasitic slot. The driven slot is positioned on the ground plane and extends along a first direction. The first parasitic slot is positioned on the ground plane and at a first side of the driven slot, in which the first parasitic slot at least extends along the first direction and a second direction different than the first direction. The second parasitic slot is positioned on the ground plane and at the first side of the driven slot, in which the second parasitic slot extends along the first direction and the second direction. The third parasitic slot is positioned on the ground plane and at a second side of the driven slot opposite the first side. A first end of the driven slot is located between the first parasitic slot and the third parasitic, and the third parasitic slot extends along the first direction and the second direction. The first parasitic slot and the third parasitic slot are symmetrical about the driven slot. The fourth parasitic slot is positioned on the ground plane and at the second side of the driven slot. A second end of the driven slot is opposite the first end and located between the second parasitic slot and the fourth parasitic, and the fourth parasitic slot extends along the first direction and the second direction. The second parasitic slot and the fourth parasitic slot are symmetrical about the driven slot.

In accordance with a second aspect of the present invention, a multi-slot antenna array is provided. The multi-slot antenna array includes a plurality of multi-slot antennas, in which the multi-slot antennas are continuously arranged along a horizontal direction.

By the configuration, a single-substrate multi-slot element with broad H-plane beamwidth is provided. Such the broad-beam element is used to design an H-plane phased array. It exhibits a remarkable beam-steering range from −90° to +90°. Further, a low-profile linear phased array antenna with wide scanning range is provided. Each array element deploys broad-beam multi-slots that can be divided into y-directed magnetic currents with same direction and four equal-magnitude x-directed magnetic currents in different directions, in which the former magnetic current provides a broadside radiation pattern and the latter magnetic currents enhance the low-elevation far-field radiation. As such, combining the former and latter currents results in a flexible wide-beam H-plane radiation pattern.

BRIEF DESCRIPTION OF DRAWINGS

Embodiments of the invention are described in more details hereinafter with reference to the drawings, in which:

FIG. 20 shows a table for comparing the array design of the present invention with reported wide-angle beam-steering linear phased arrays.

DETAILED DESCRIPTION OF THE INVENTION

In the following description, multi-slot antennas and low-profile phased array antennas using the same for wide steering range in communication and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Wide-angle scanning phased array antennas have been widely used in different applications, such as radar, satellite communication, automotive sensing, and mobile telecommunication. A broad-beam antenna element can be used to widen the scan range effectively. However, the existing work on broad-beam antenna elements for wide-angle scanning phased arrays has at least one of the following disadvantages such as high profile, large footprint, complicated structure, high cost, limited scan range, etc. In the present invention, a multi-slot antenna and a multi-slot antenna array using the same are disclosed for addressing the mentioned disadvantages.

Firstly, operating principle of hybrid magnetic current technique is introduced. A wide-beam radiation pattern can be obtained by combining two complementary radiation patterns. The slot antenna is selected because of its low profile and single-substrate structure. In general, a conventional slot antenna has a broadside radiation pattern. It is therefore a challenge to obtain an end-fire radiation pattern from the slot antenna.

Figure 1:
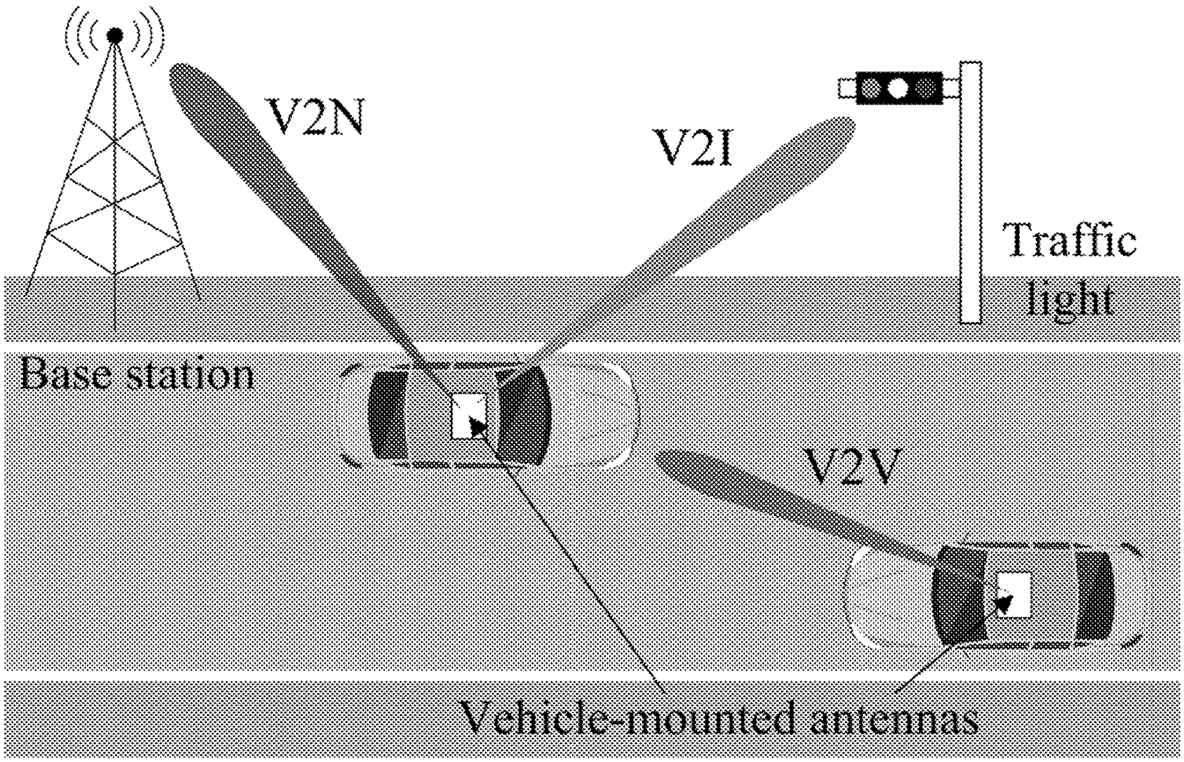
FIG. 1 shows the application scenario of a vehicle-mounted antenna for V2X communications.
Figure 2A:
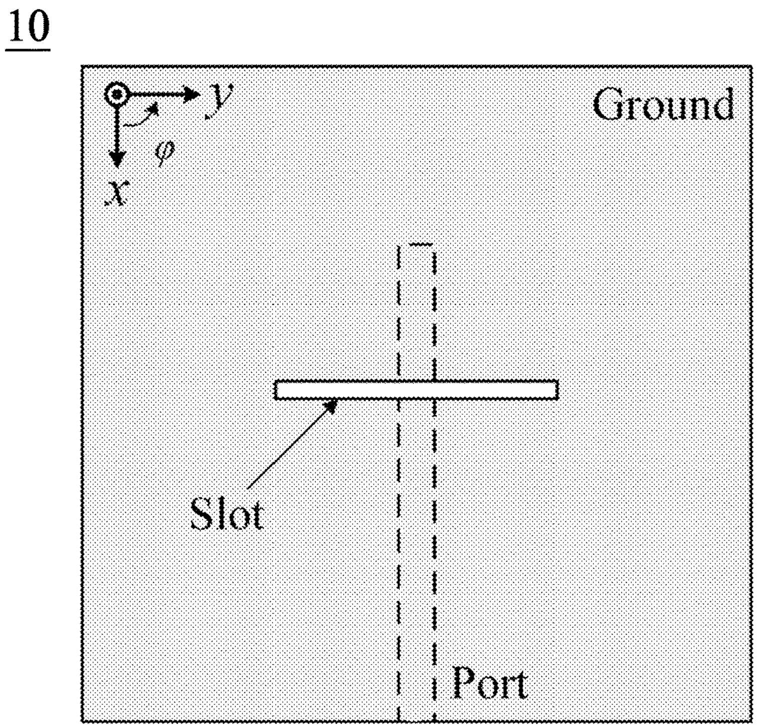
FIG. 2A and FIG. 2B show the configurations of a slot antenna and a 4-slot antenna.
Figure 2B:
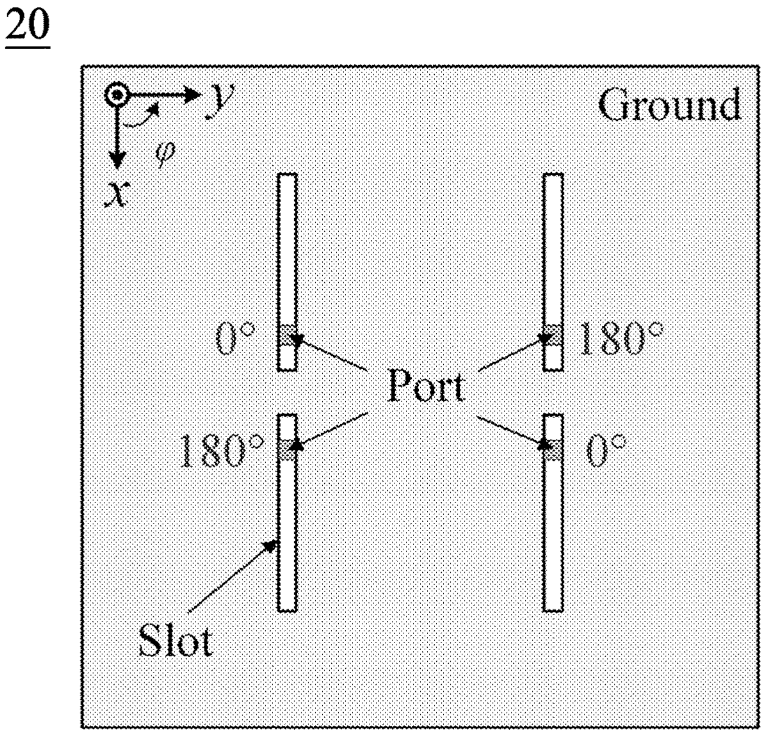
Figure 3A:
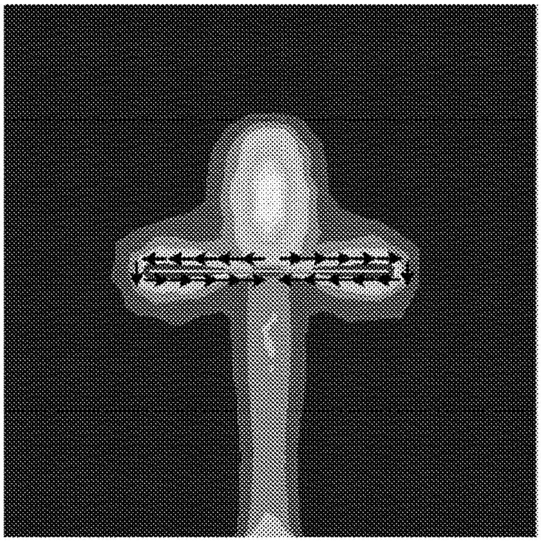
FIG. 3A, FIG. 3B, FIG. 3C, and FIG. 3D show the simulated electric current distribution(s) on the ground plane and the equivalent magnetic current(s) in the slot(s) for each slot configuration of FIG. 2A and FIG. 2B.
Figure 3B:
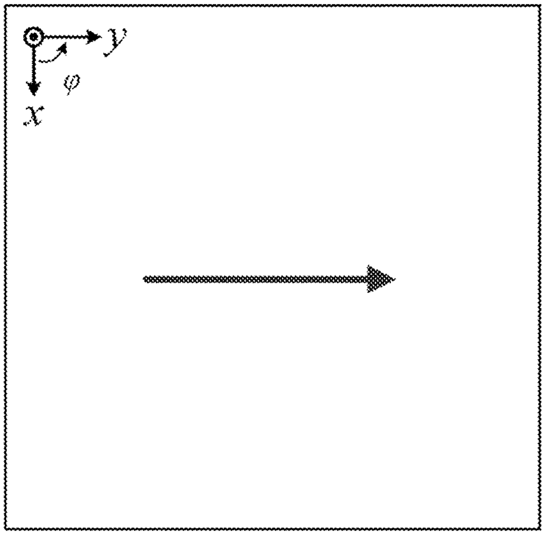
Figure 3C:
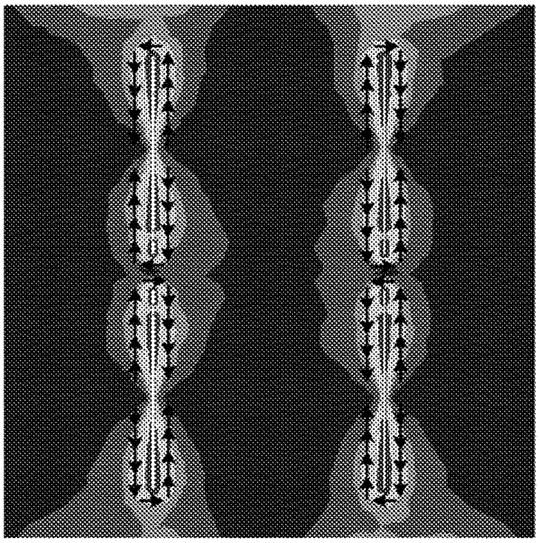
Figure 3D:
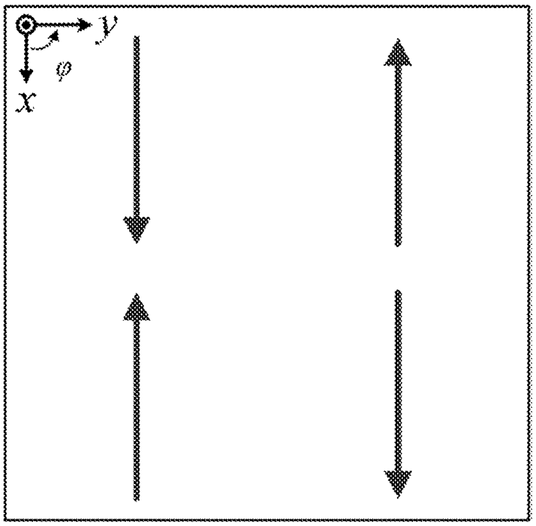

FIG. 2A and FIG. 2B show the configurations of a slot antenna 10 and a 4-slot antenna 20. The slot antenna 10 is fed by a microstrip line, and the 4-slot antenna 20 is directly excited by lumped ports in using high-frequency structure simulator (HFSS). FIGS. 3A, 3B, 3C, and 3D show the simulated electric current distribution(s) on the ground plane and the equivalent magnetic current(s) in the slot(s) for each slot configuration of FIG. 2A and FIG. 2B. Specifically, FIG. 3A shows electric current distribution the slot antenna 10; FIG. 3B shows equivalent magnetic current of the slot antenna 10; FIG. 3C shows electric current distribution of the 4-slot antenna 20; and FIG. 3D shows equivalent magnetic currents of the 4-slot antenna 20.

Figure 4A:
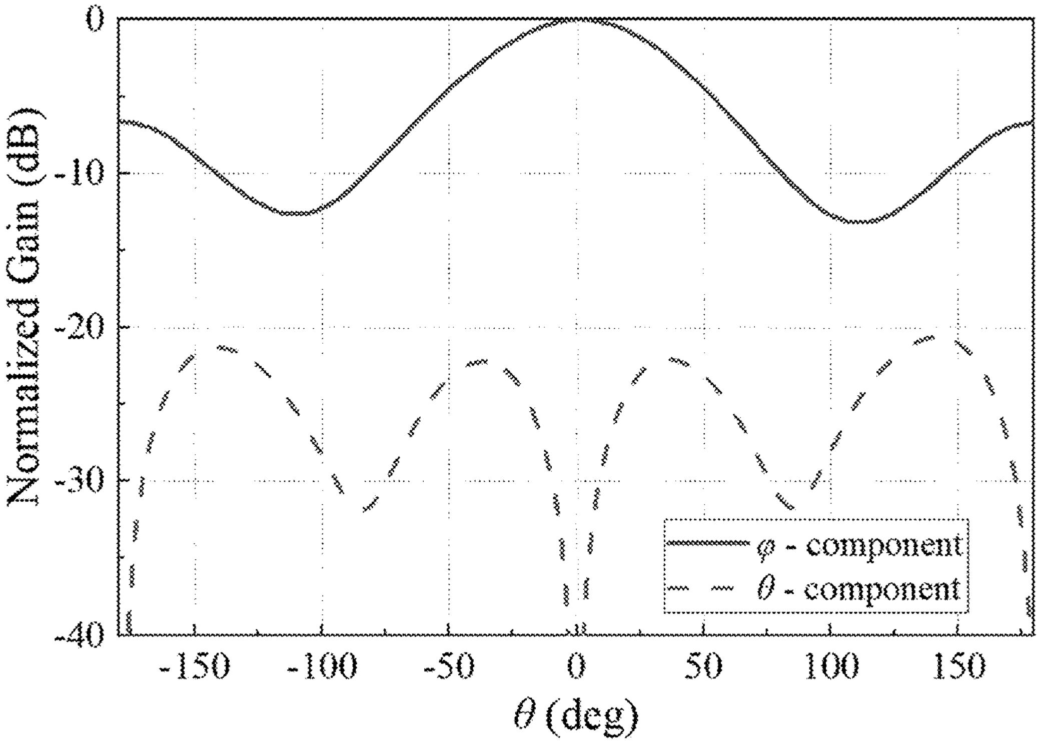
FIG. 4A shows simulated yoz-plane normalized radiation patterns of the slot antenna.

As shown in FIG. 3A, the electric currents around the slot have both x- and y-directions. However, the y-directed currents with opposite directions will cancel out each other, leaving the x-directed current only. This x-directed current is orthogonal to the y-directed equivalent magnetic current in FIG. 3B. Thus, the E-field of the slot antenna 10 is φ-polarized in the yoz-plane as verified by the simulated radiation pattern in FIG. 4A, which shows simulated yoz-plane normalized radiation patterns of the slot antenna 10.

Figure 4B:
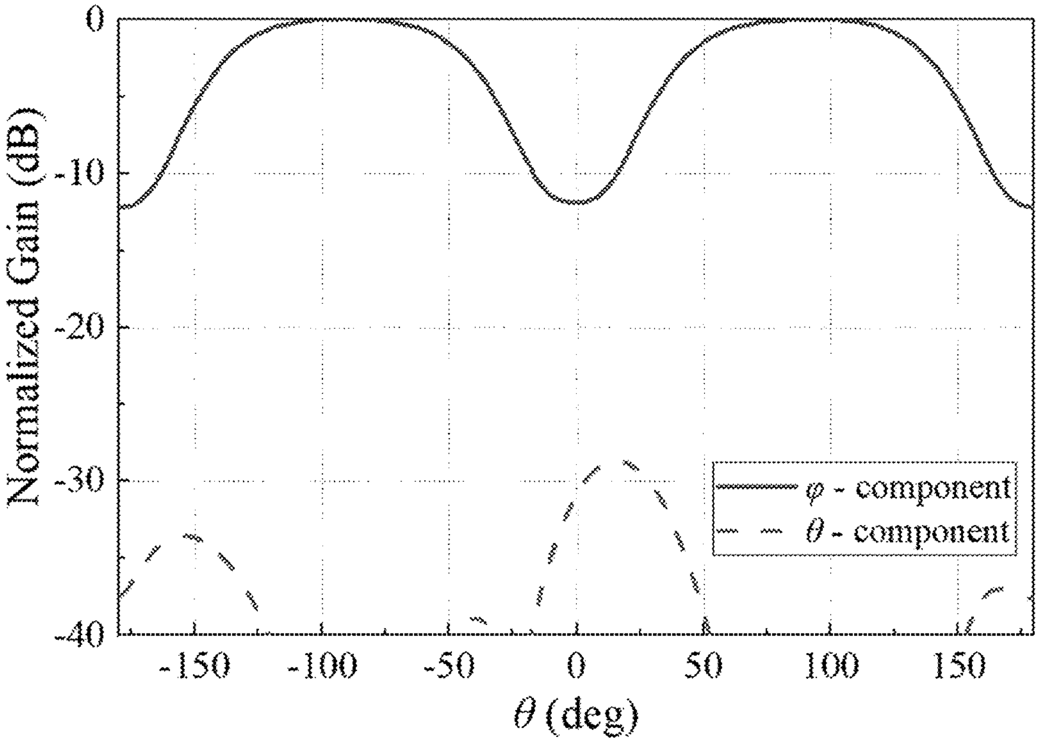
FIG. 4B shows simulated yoz-plane normalized radiation patterns of the 4-slot antenna.

There is a more complicated situation for the 4-slot antenna 20. With reference to FIG. 3C, each slot of the 4-slot antenna 20 can be modeled by an x-directed magnetic current. The four magnetic currents have the same magnitude but opposite directions between any two adjacent ones, as shown in FIG. 3D. For each magnetic current, its radiated field in the yoz-plane is θ-polarized. However, since these magnetic currents are in opposite directions, their θ-polarized field components in the yoz-plane will cancel out each other, leaving their cross-polarized fields (φ-polarized components) which effectively become the new co-polarized fields. In other words, the co- and cross-polarized field components of the 4-slot antenna 20 are interchanged with those of a single x-directed slot. FIG. 4B shows simulated yoz-plane normalized radiation patterns of the 4-slot antenna 20, which provide this analysis is validated by the normalized yoz-plane radiation pattern of the 4-slot antenna 20.

Figure 5:
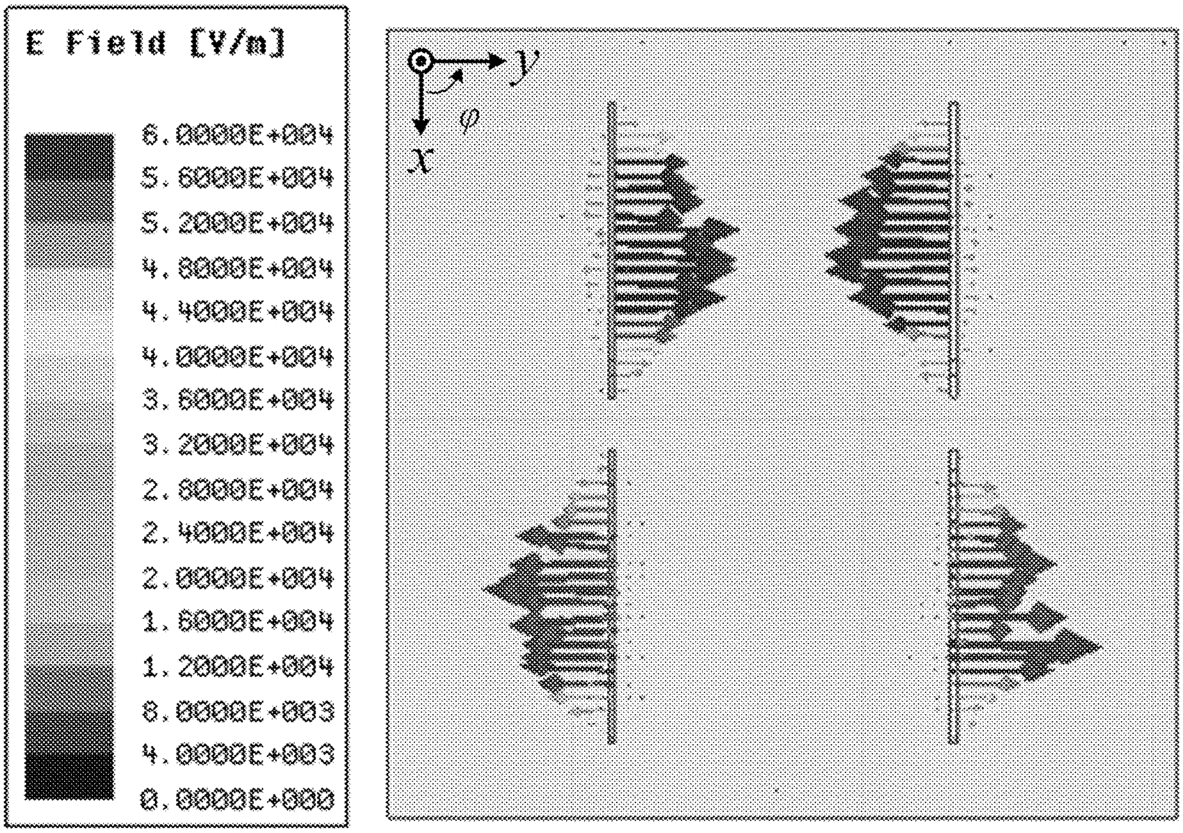
FIG. 5 shows the transverse electric fields in the slots of 4-slot antenna to further clarify the relationship between the electric and magnetic components.

FIG. 5 shows the transverse electric fields in the slots of 4-slot antenna 20 to further clarify the relationship between the electric and magnetic components. As can be seen, the electric field vectors are all along y-direction, orthogonal to their x-directed equivalent magnetic currents shown in FIG. 3D. It is also clearer to observe that the phase between any two adjacent slots is opposite.

With reference back to FIGS. 4A and 4B, it is found that the slot antenna 10 and the 4-slot antenna 20 have their peak directivities in the boresight (θ=0°) and end-fire (θ=±90°)+90° directions, respectively. In other words, these two radiation patterns are complementary to each other over a broad beam-angle in the yoz-plane. Here, the equivalent magnetic currents of the slot antenna 10 and the 4-slot antenna 20 are named as first magnetic current (MC1) and second magnetic current (MC2), respectively. A flexible beam shape can be obtained by superimposing the radiation patterns generated by these two types of currents with different weighting coefficients as follows:

$$G(\theta) = A \cdot G_1(\theta) + (1 - A) \cdot G_2(\theta) \quad \text{equation (1)}$$

where G(θ) is the resultant radiation pattern, and $G_1(\theta)$ and $G_2(\theta)$ are the individual radiation patterns of the first magnetic current (MC1) and the second magnetic current (MC2) with weighting coefficients of A and (1-A), respectively.

Figure 6:
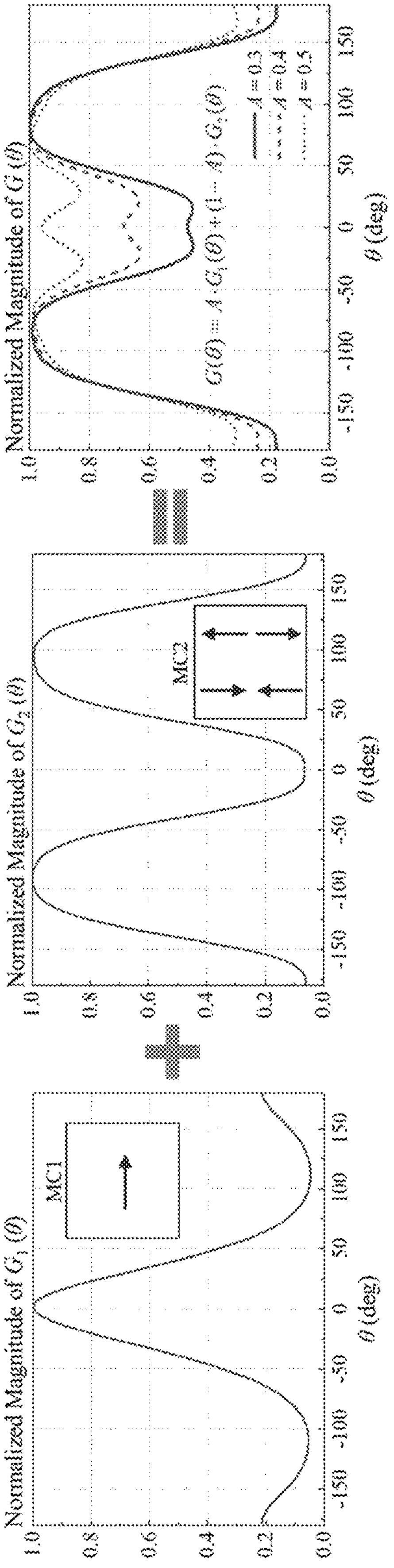
FIG. 6 shows the combined yoz-plane radiation patterns generated by the first magnetic current and the second magnetic current with different coefficients.

To understand equation (1) better, FIG. 6 shows the combined yoz-plane radiation patterns generated by the first magnetic current and the second magnetic current with different coefficients A (i.e., combination of yoz-plane radiation patterns generated by MC1 and MC2 with different coefficient A). To use equation (1) directly, the radiation patterns have been expressed in their linear form. With reference to the figures in FIG. 6, the combined radiation patterns are wide-beam with different center dips. When the coefficient A=0.5, the field magnitude around the center is higher than 0.8, giving small center ripples and thus, a small gain fluctuation of less than 1 dB. Therefore, a flexible broad beam can be obtained by exciting the first magnetic current and the second magnetic current simultaneously with controllable amplitudes.

Figure 7A:
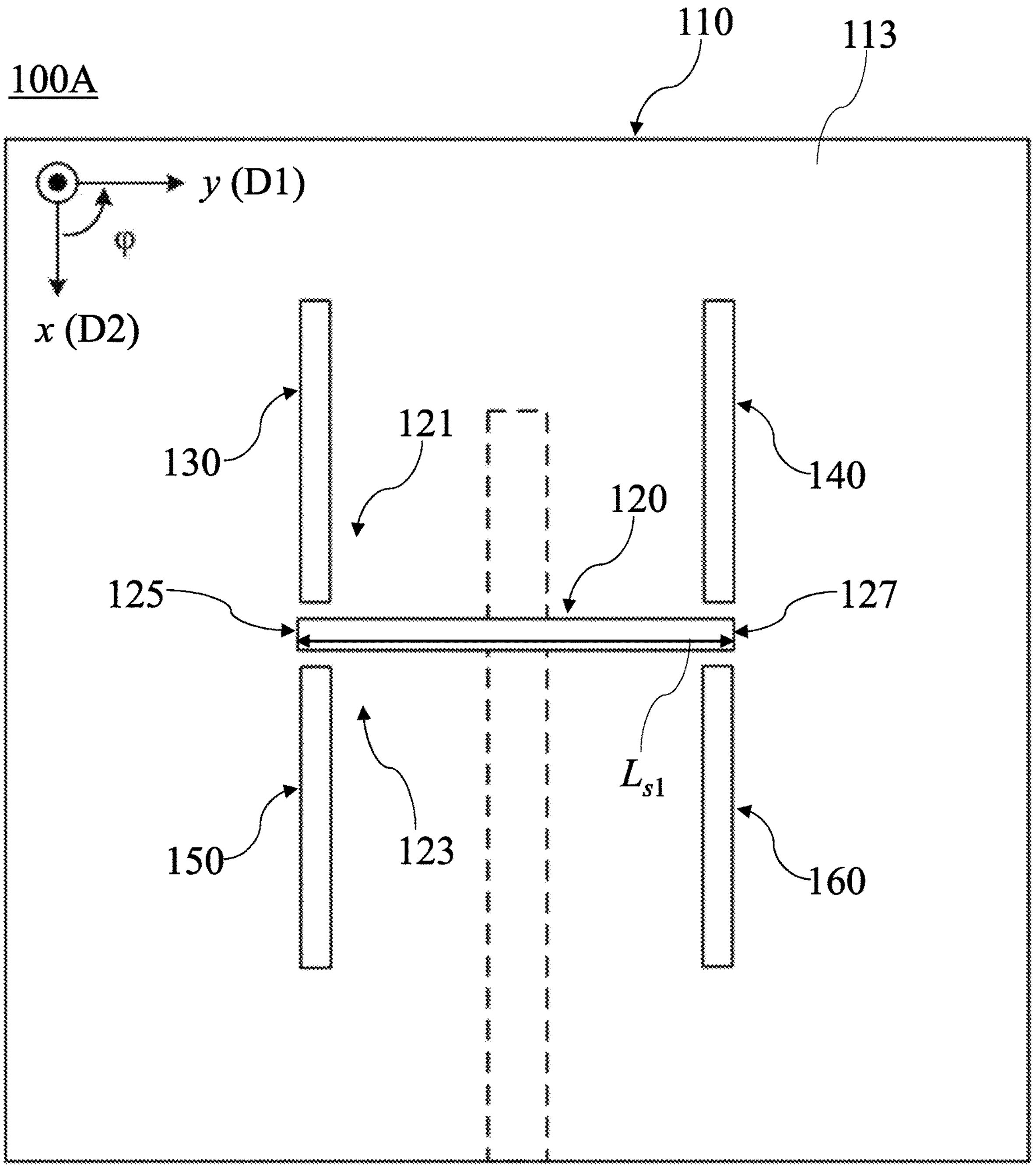
FIG. 7A depicts a schematic top view of a preliminary multi-slot antenna according to one embodiment of the present invention.

According to the mechanism discussed above, a design of a flexible wide-beam multi-slot antenna element is provided. FIG. 7A depicts a schematic top view of a multi-slot antenna 100A according to one embodiment of the present invention. To make the description easy to understand, a first direction D1 and a second direction D2 are illustrated in FIG. 7A as well. The first direction D1 is different than the second direction D2; in one embodiment, they are orthogonal to each other. For example, the first direction D1 serve as a horizontal direction y and the second direction D2 serve as a vertical direction x.

The multi-slot antenna 100A has a configuration which may consist of the slot antenna 10 and the 4-slot antenna 20. Specifically, the multi-slot antenna 100A includes a printed circuit board (PCB) 110, a driven slot 120, a first parasitic slot 130, a second parasitic slot 140, a third parasitic slot 150, and a fourth parasitic slot 160.

The PCB 110 may include a ground plane 113 and a dielectric substrate (not illustrated), in which the ground plane 113 is disposed over the dielectric substrate.

In one embodiment, the ground plane 113 includes conductive material, such as metal or alloy. In one embodiment, the PCB 110 is composed of the ground plane 113 and the dielectric substrate, referred as to a single-substrate structure.

The driven slot 120, the first parasitic slot 130, the second parasitic slot 140, the third parasitic slot 150, and the fourth parasitic slot 160 are positioned on the ground plane 113. In one embodiment, the parasitic slots are formed by etching the ground plane 113 such that they can be located on the ground plane 113.

The driven slot 120 is positioned on the ground plane 113 and extends along the first direction D1. The driven slot 120 is located at a center of the ground plane 113. Herein, the term "be located at a center of the ground plane 113" includes a center of the driven slot 120 (e.g., the centroid of the driven slot 120) overlaps with the centroid of the ground plane 113.

The first parasitic slot 130, the second parasitic slot 140, the third parasitic slot 150, and the fourth parasitic slot 160 can be excited with the required phase relationship by the central driven slot 120.

The first parasitic slot 130 and the second parasitic slot 140 are positioned on the ground plane and are at a first side 121 of the driven slot 120 (e.g., the upper side of the driven slot 120). The first parasitic slot 130 and the second parasitic slot 140 extend along the second direction D2 such that the second parasitic slot 140 may be parallel to the first parasitic slot 130.

The third parasitic slot 150 and the fourth parasitic slot 160 are positioned on the ground plane and are at a second side 123 of the driven slot 120 opposite the first side 121 (e.g., the bottom side of the driven slot 120). The third parasitic slot 150 and the fourth parasitic slot 160 extend along the second direction D2 such that the fourth parasitic slot 160 may be parallel to the third parasitic slot 150.

Furthermore, the driven slot 120 has a first end 125 and a second end 127 which are opposite. The first end 125 of the driven slot 120 is located between the first parasitic slot 130 and the third parasitic 150, in which the first parasitic slot 130 and the third parasitic slot 150 are symmetrical about the driven slot 120. The second end 127 of the driven slot 120 is located between the second parasitic slot 140 and the fourth parasitic 160, in which the second parasitic slot 140 and the fourth parasitic slot 160 are symmetrical about the driven slot 120.

By such the configuration, the combination of the driven slot 120, the first parasitic slot 130, the second parasitic slot 140, the third parasitic slot 150, and the fourth parasitic slot 160 is presented as being H-shaped on the ground plane 113.

Figure 7B:
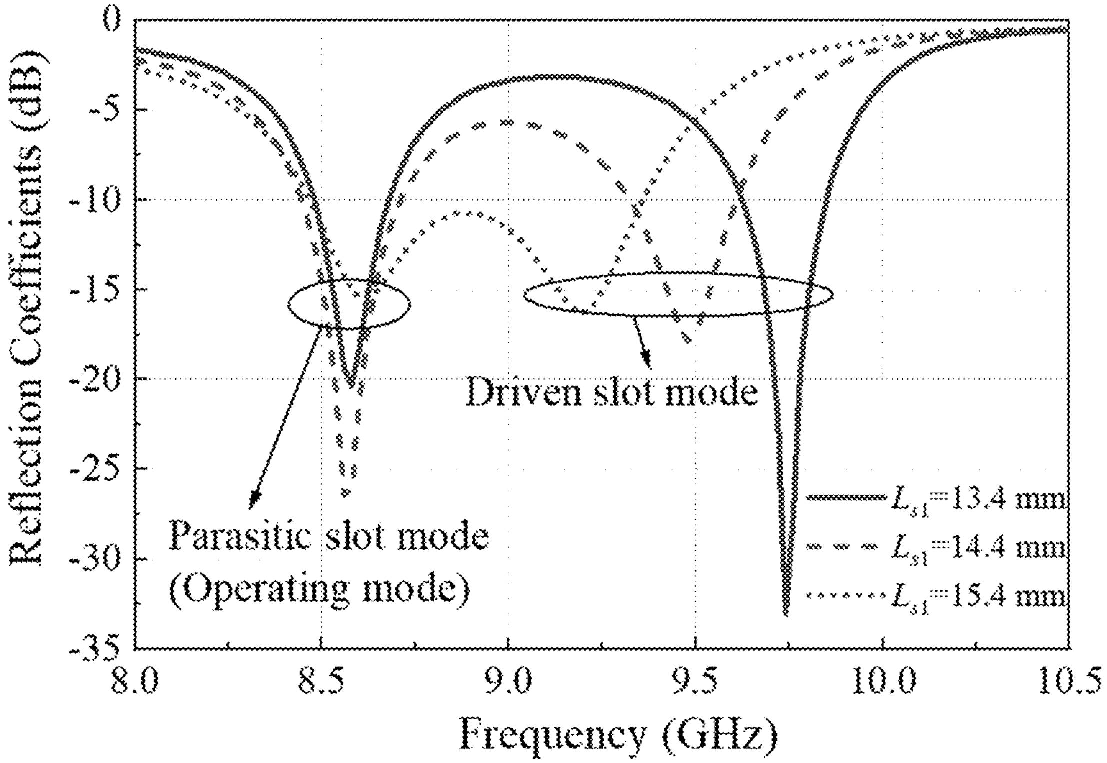
FIG. 7B shows the simulated reflection coefficient of the preliminary multi-slot antenna 100A with different driven slot lengths according to one embodiment of the present invention.

FIG. 7B shows the simulated reflection coefficient of the multi-slot antenna 100A with different driven slot lengths according to one embodiment of the present invention. As illustrated by FIG. 7B, the driven slot mode can get closer to the parasitic slot mode by increasing $L_{s1}$, which is a length of the driven slot 120 along the direction D1. When $L_{s1}$=15.4 mm, the driven and parasitic slot modes are merged together, leading to a wider impedance bandwidth. However, larger $L_{s1}$ means a larger radiator dimension along y-direction, which will limit the choice of inter-element spacing in the array design.

For the phased array with wide scan range, it usually requires the inter-element spacing to be less than half wavelength to avoid grating lobe problems. In this regard, the electrical length of the driven slot 120 is around half wavelength, leading to a relatively large inter-element spacing in the array design. To obtain a small inter-element spacing, $L_{s1}$=13.4 mm is utilized, and the antenna is finally designed to operate at the parasitic slot mode only.

Regarding to the curve of $L_{s1}$=13.4 mm in FIG. 7B, the parasitic slot mode operates at 8.6 GHz, with a compact y-dimension of $0.38\lambda_0$, where $\lambda_0$ represents the wavelength in vacuum at the given frequency. However, since the driven slot mode resonates at a higher frequency (9.75 GHZ), the weighting coefficient of the y-directed magnetic current (MC1) is small at 8.6 GHz, leading to a large center dip in the yoz-plane radiation pattern.

In order to further improve the performance, L-shaped parasitic slots for beam tuning are considered. More specifically, to enhance the effect of the y-directed magnetic current, L-shaped slots are used in place of the straight parasitic slots in the antenna design.

Figure 8A:
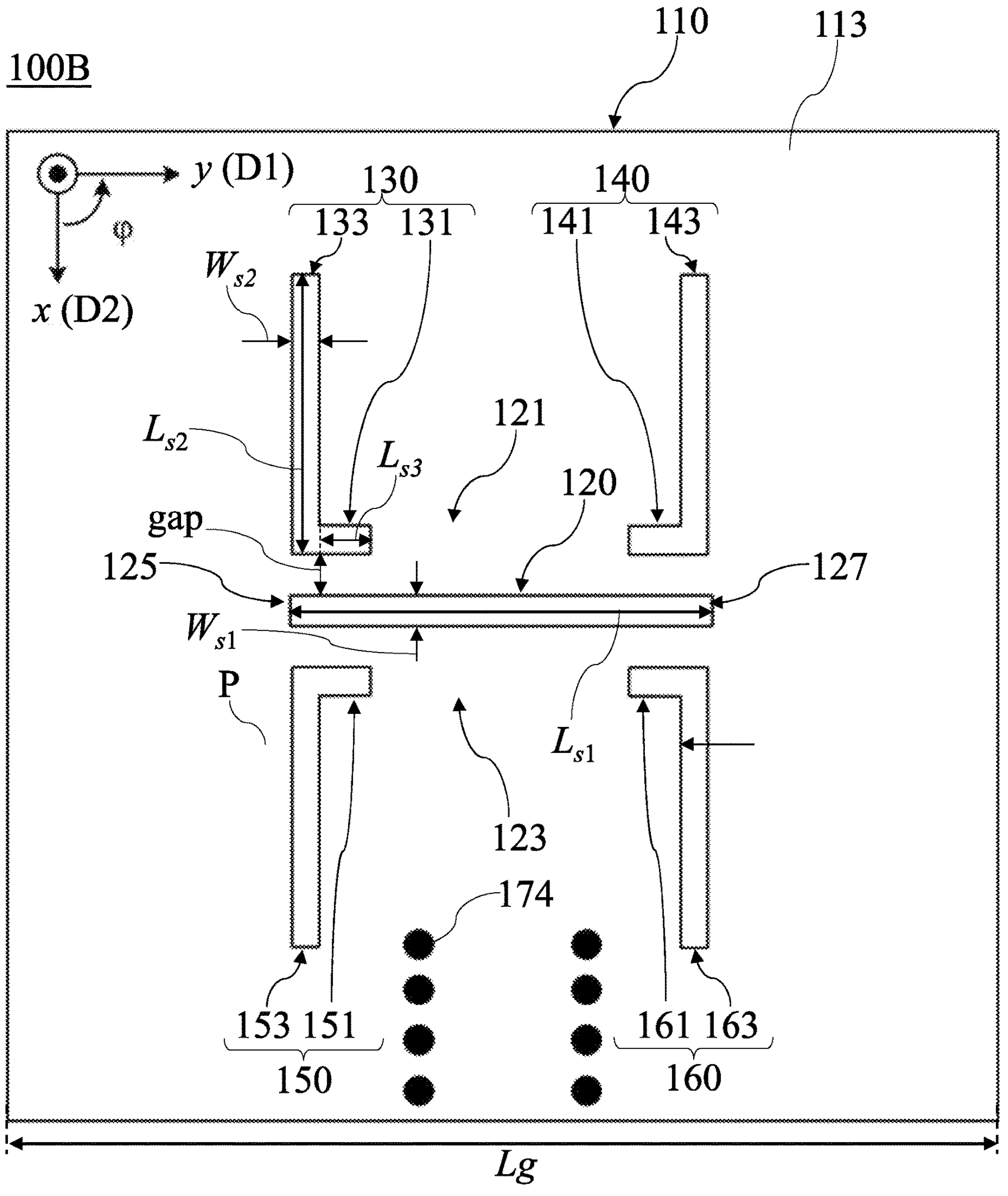
FIG. 8A and FIG. 8B respectively depict a schematic top view and a bottom view of the improved multi-slot antenna according to one embodiment of the present invention.
Figure 8B:
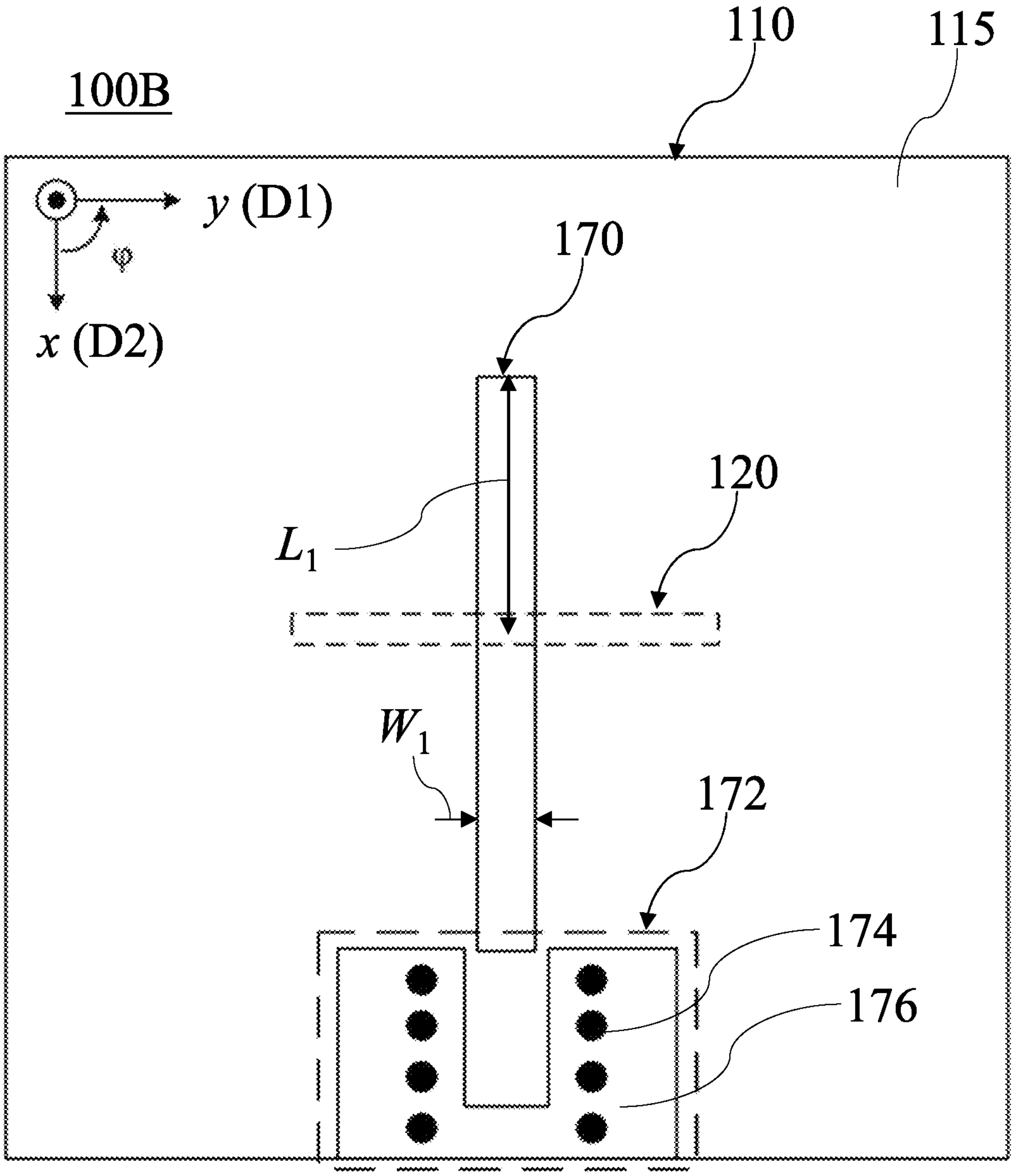

FIG. 8A and FIG. 8B respectively depict a schematic top view and a bottom view of a multi-slot antenna 100B according to one embodiment of the present invention. The multi-slot antenna 100B relatively to the multi-slot antenna 100A can serve as an improved model or multi-slot antenna (i.e., the multi-slot antenna 100A may serve as a preliminary model or a preliminary multi-slot antenna). It is noted that although the improved multi-slot antenna 100B may serve as the next generation model to the multi-slot antenna 100A, any other suitable modification or optimization on the multi-slot antenna 100B is available and is permitted. To make the description easy to understand, a first direction D1 and a second direction D2 are illustrated in FIG. 8A and FIG. 8B as well. The first direction D1 is different than the second direction D2; in one embodiment, they are orthogonal to each other. For example, the first direction D1 serve as a horizontal direction y and the second direction D2 serve as a vertical direction x.

The multi-slot antenna 100B is similar with the multi-slot antenna 100A, except that the first parasitic slot 130, the second parasitic slot 140, the third parasitic slot 150, and the fourth parasitic slot 160 are L-shaped.

Specifically, each of the first parasitic slot 130, the second parasitic slot 140, the third parasitic slot 150, and the fourth parasitic slot 160 extends along the first direction D1 as well as the second direction D2, forming a L-shape. The driven slot 120, the first parasitic slot 130, the second parasitic slot 140, the third parasitic slot 150, and the fourth parasitic slot 160 can be formed by etching the ground plane 113 of the PCB 110, which means they can be printed on the top face of the PCB 110.

The driven slot 120 is positioned on the ground plane 113 and extends along the first direction D1. The driven slot 120 is located at a center of the ground plane 113. The driven slot 120 is can serve as a microstrip-fed driven slot etched at the center of the ground plane 113. The driven slot 120 has a length $L_{s1}$ along the first direction D1 in a range from 10 mm to 15 mm and a width $W_{s1}$ along the second direction D2 in a range from 0.15 mm to 0.25 mm. In one embodiment, the length $L_{s1}$ is about 13.4 mm, and the width $W_{s1}$ is about 0.2 mm.

In the present embodiment, each of the first parasitic slot 130, the second parasitic slot 140, the third parasitic slot 150, and the fourth parasitic slot 160 includes a first extending portion 131, 141, 151, 161 and a second extending portion 133, 143, 153, 163. The following descriptions take the first extending portion 131 and the second extending portion 133 of the first parasitic slot 130 as an example, and these descriptions can be applied to other first extending portions 141, 151, 161 and second extending portions 143, 153, 163.

In the first parasitic slot 130, the first extending portion 131 extends along the first direction D1, and the second extending portion 133 is connected to the first extending portion 131 and extends along the second direction D2. The first extending portion 131 is shorter than the second extending portion 133 and is closer to the driven slot 120 than a distal end of the second extending portion 133, defining the L-shape. To further define the L-shape, the first extending portion 131 is closer to the center of the driven slot 120 than the second extending portion 133.

The first extending portion 131 has a length $L_{s3}$ along the first direction D1 in a range from 1 mm to 1.5 mm. The second extending portion 133 has a length $L_{s2}$ along the second direction D2 in a range from 5 mm to 15 mm and a width $W_{s2}$ along the first direction D1 in a range from 0.1 mm to 0.3 mm. In one embodiment, the length $L_{s2}$ is about 10 mm and the width $W_{s2}$ is about 0.2 mm, and the length $L_{s3}$ is about 1.2 mm. Furthermore, the L-shaped first parasitic slot 130 is separated from the driven slot 120 by a gap in a range from 0.5 mm to 1.5 mm. In one embodiment, the gap is about 1.05 mm.

The first extending portion 131 of the first parasitic slot 130 and the first extending portion 141 of the second parasitic slot 140 are located between the second extending portion 133 of the first parasitic slot 130 and the second extending portion 143 of the second parasitic slot 140. Accordingly, the L-shaped first parasitic slot 130 and the L-shaped second parasitic slot 140 can have profiles/outlines that are symmetrical about a vertical axis of the driven slot 120, which means the profiles/outlines of the L-shaped first parasitic slot 130 and the L-shaped second parasitic slot 140 are opposite (i.e., the profile/outline of the L-shaped first parasitic slot 130 is the same as that of the L-shaped second parasitic slot 140 when horizontally mirroring the L-shaped first parasitic slot 130.

The first extending portion 131 of the first parasitic slot 130 and the first extending portion 151 of the third parasitic slot 150 are located between the second extending portion 133 of the first parasitic slot 130 and the second extending portion 153 of the third parasitic slot 150. Accordingly, the L-shaped first parasitic slot 130 and the L-shaped third parasitic slot 150 can have profiles/outlines that are symmetrical about a horizontal axis of the driven slot 120, which means the profiles/outlines of the L-shaped first parasitic slot 130 and the L-shaped third parasitic slot 150 are opposite (i.e., the profile/outline of the L-shaped first parasitic slot 130 is the same as that of the L-shaped third parasitic slot 150 when vertically mirroring the L-shaped first parasitic slot 130.

By such the configuration, the first parasitic slot 130 and the third parasitic slot 150 are in the L-shape symmetrical about the driven slot 120, and the second parasitic slot 140 and the fourth parasitic slot 160 are in the L-shape symmetrical about the driven slot 120. In one embodiment, below and above the driven slot 120, there are four identical L-shaped parasitic slots symmetrically etched on the ground plane 113.

Regarding the bottom view of the multi-slot antenna 100B, as illustrated in FIG. 8B, the multi-slot antenna 100B further includes a microstrip 170 for feeding the driven slot 120 is located at a center of the dielectric substrate 115 of the PCB 110. The multi-slot antenna 100B further includes an SMP grounded mounting area 172 that is reserved for mounting a connector (not illustrated), having several grounding metallic vias 174 and a soldering pad 176. In one embodiment, the microstrip 170 has a length $L_1$ along the second direction D2 about 8.4 mm and a width $W_1$ along the first direction D1 about 1.82 mm.

In one embodiment, the PCB 110 has a square profile and has a side length of $L_g$ in about 30 mm, a thickness of about 0.813 mm, and a substrate dielectric constant of 3.38, resulting in a PCB with single-substrate-layer structure.

The parameters of the multi-slot antenna 100*b* are listed in TABLE I.

TABLE I

| Parameter | Value (mm) | Parameter | Value (mm) |
|---|---|---|---|
| $L_g$ | 30 | $L_1$ | 8.4 |
| $L_{s1}$ | 13.4 | $L_{s2}$ | 10 |
| $L_{s3}$ | 1.2 | $W_1$ | 1.82 |
| $W_{s1}$ | 0.2 | $W_{s2}$ | 0.2 |
| gap | 1.05 | | |

Figure 9:
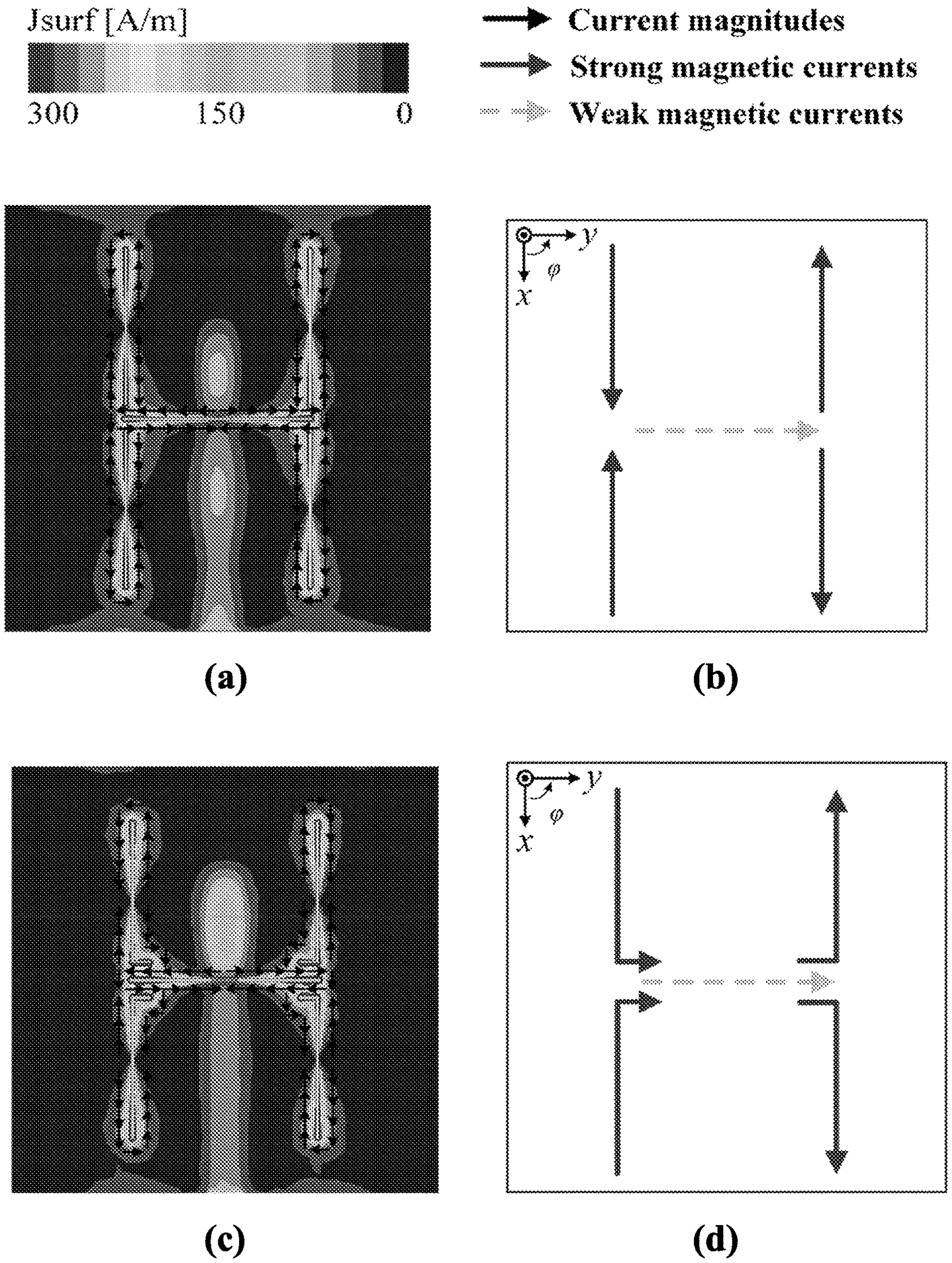
FIG. 9 depicts Simulated electric current distributions and equivalent magnetic currents at 8.6 GHz, in which the section (a) is electric current distribution of the preliminary multi-slot antenna; the section (b) is equivalent magnetic currents of the preliminary multi-slot antenna; the section (c) is electric current distribution of the improved multi-slot antenna; and the section (d) is equivalent magnetic currents of the improved multi-slot antenna.

The multi-slot antenna 100B can be designed in X-band and simulated with ANSYS HFSS as follows. FIG. 9 depicts Simulated electric current distributions and equivalent magnetic currents at 8.6 GHz, in which the section (a) is electric current distribution of the multi-slot antenna 100A; the section (b) is equivalent magnetic currents of the multi-slot antenna 100A; the section (c) is electric current distribution of the multi-slot antenna 100B; and the section (d) is equivalent magnetic currents of the multi-slot antenna 100B.

As shown in the sections (a) and (c) of FIG. 9, the parasitic slots are effectively coupled by the central driven slots. Their respective equivalent configurations are given in the sections (b) and (d) of FIG. 9. As can be observed from the section (b) of FIG. 9, the equivalent configuration of the section (a) of FIG. 9 consists of four x-directed magnetic currents (MC2) and a weak y-directed magnetic current (horizontal dashed vector) at 8.6 GHz. The section (d) of FIG. 9 shows a similar equivalent configuration for the section (c) of FIG. 9, except that there are strong y-directed magnetic currents (MC1) around the middle due to the additional horizontal arms ($L_{s3}$) of the L-shaped slots. It can be seen that the four L-shaped magnetic currents can be divided into MC1 and MC2. Moreover, the weighting coefficient A of MC1 can be flexibly controlled by modifying $L_{s3}$.

Figure 10:
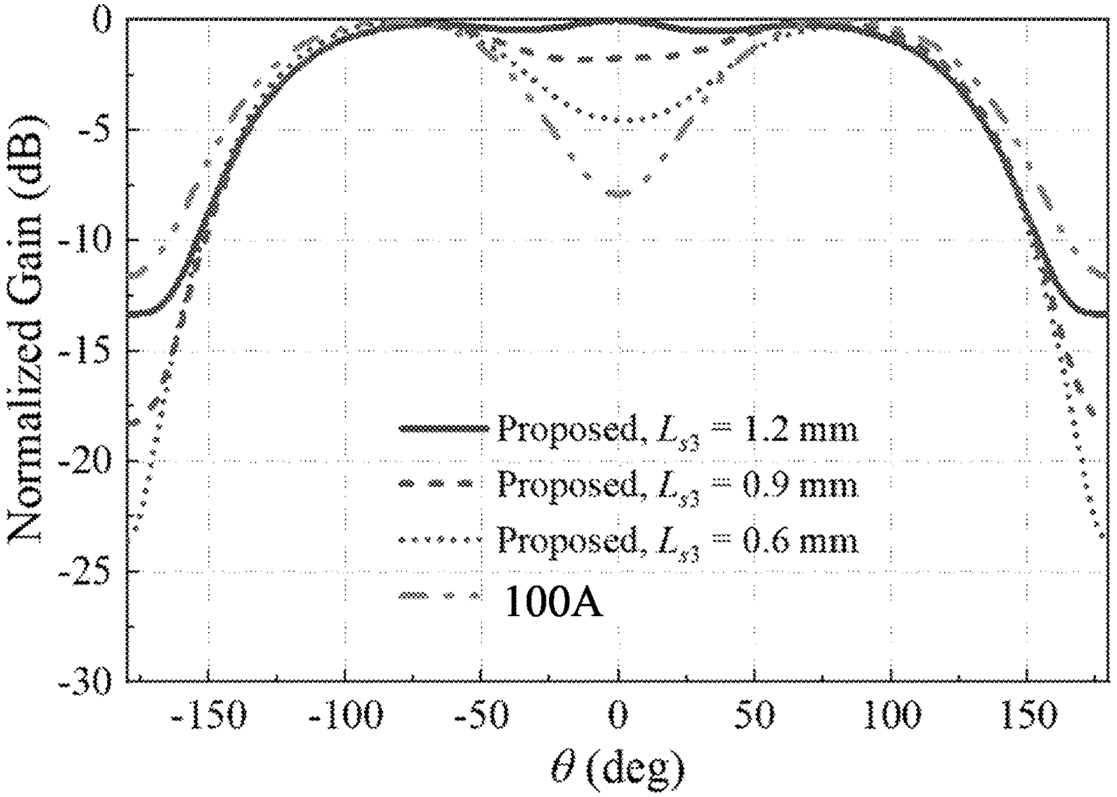
FIG. 10 shows the simulated normalized yoz-plane radiation patterns of the multi-slot antennas for the proposed different $L_{s3}$.
Figure 11:
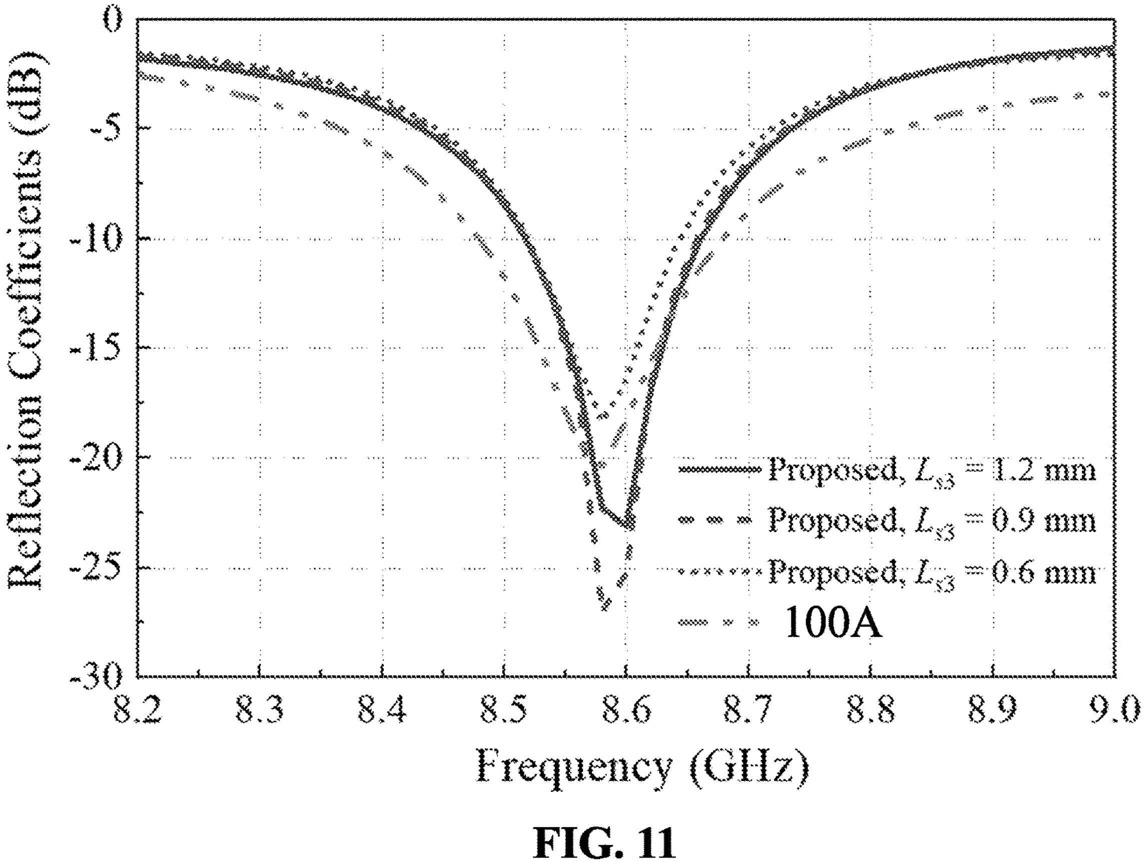
FIG. 11 depicts simulated reflection coefficients of the preliminary multi-slot antenna with $L_{s1}$=13.4 mm and the improved multi-slot antenna with different $L_{s3}$

FIG. 10 shows the simulated normalized yoz-plane radiation patterns of the multi-slot antenna 100A and the multi-slot antenna 100B for the proposed different $L_{s3}$. Here, the total length of the L-shaped slot is kept unchanged. The figure shows that the multi-slot antenna 100A has a large center dip in its radiation pattern. This problem is effectively reduced by increasing $L_{s3}$ in the multi-slot antenna 100B. It is because the broadside radiation is strengthened by the y-directed magnetic currents of the horizontal arm ($L_{s3}$) of the L-shaped slots. It is important to note that as $L_{s3}$ is changed, both the resonant frequency and impedance match are not affected significantly, as shown in FIG. 11, which depicts simulated reflection coefficients of multi-slot antenna 100A with $L_{s1}$=13.4 mm and the multi-slot antenna 100B with different $L_{s3}$. It greatly facilitates the antenna design.

The experimental results and discussion are provided as follows.

Figure 12:
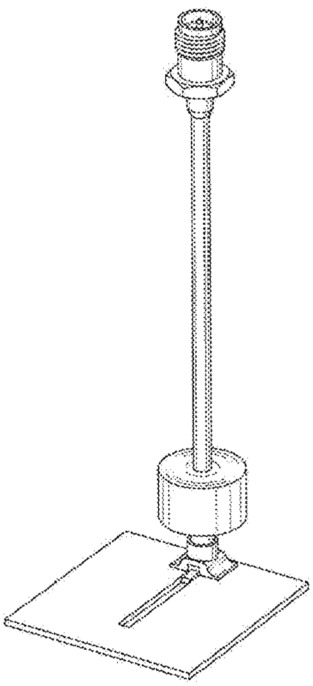
FIG. 12 depicts photos of proposed multi-slot element prototype, in which the section (a) refers to a perspective view and the section (b) refers to a top view.
Figure 12:
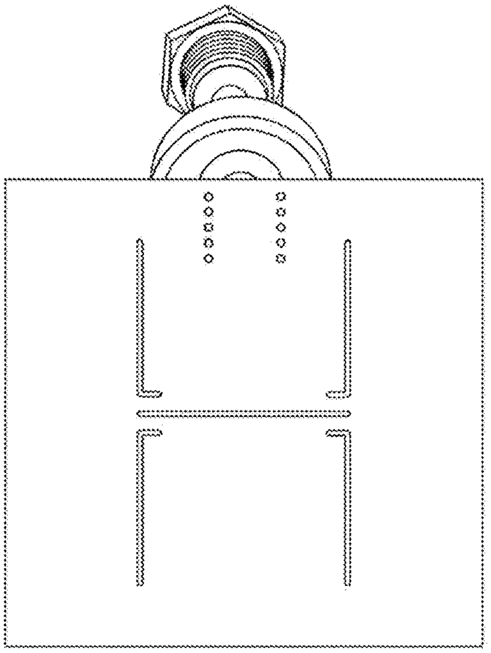

FIG. 12 depicts photos of proposed multi-slot element prototype, in which the section (a) refers to a perspective view and the section (b) refers to a top view.

In FIG. 12, the corresponding parameter values as aforementioned are applied. An RF choke is used to prevent the return current from flowing to the SMP connector and feeding cable. Its optimized outer diameter, height, and thickness are 12 mm, 7.5 mm, and 1 mm, respectively.

Figure 13:
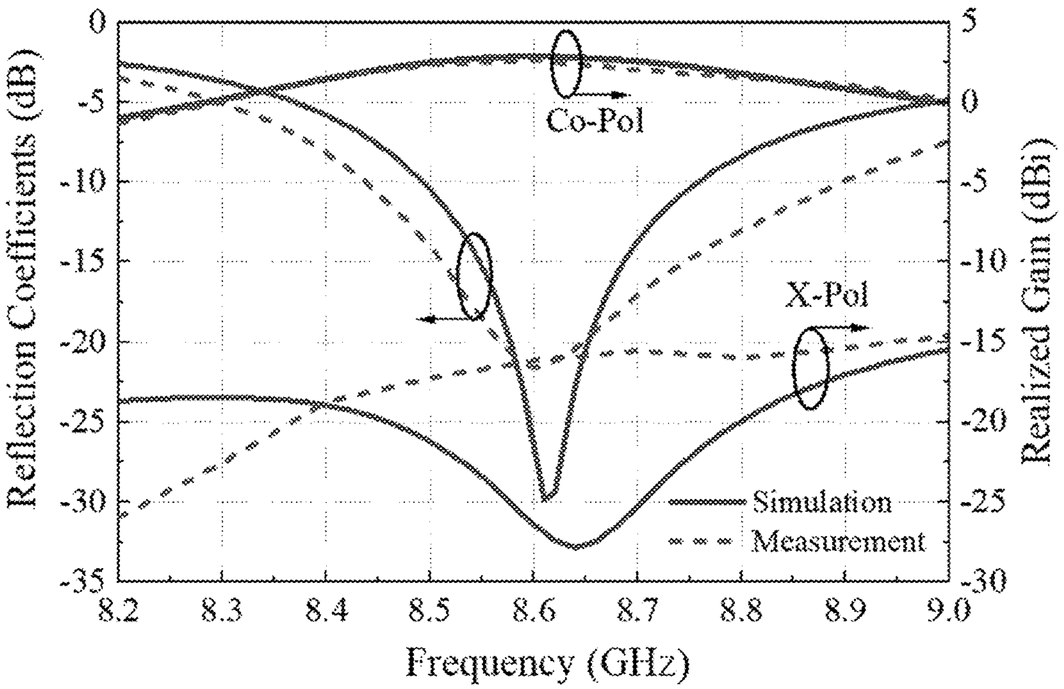
FIG. 13 shows the measured and simulated reflection coefficients of the prototype, with satisfactory agreement between them.

FIG. 13 shows the measured and simulated reflection coefficients of the prototype, with satisfactory agreement between them. As can be seen from the figure, the measured and simulated 10-dB impedance bandwidths are 5.2% (8.44-8.89 GHZ) and 3.1% (8.49-8.76 GHZ), respectively. With reference to the figure again, the measured and simulated co-polarized gains are 2.7 dBi and 2.9 dBi, respectively, whereas the cross-polarized gains are all below −15 dBi within the impedance bandwidth. The discrepancy between the measured and simulated cross-polarized gains is larger than the co-polarized counterparts. This is because the cross-polar components are generally more sensitive to the fabrication and experimental tolerances.

Figure 14:
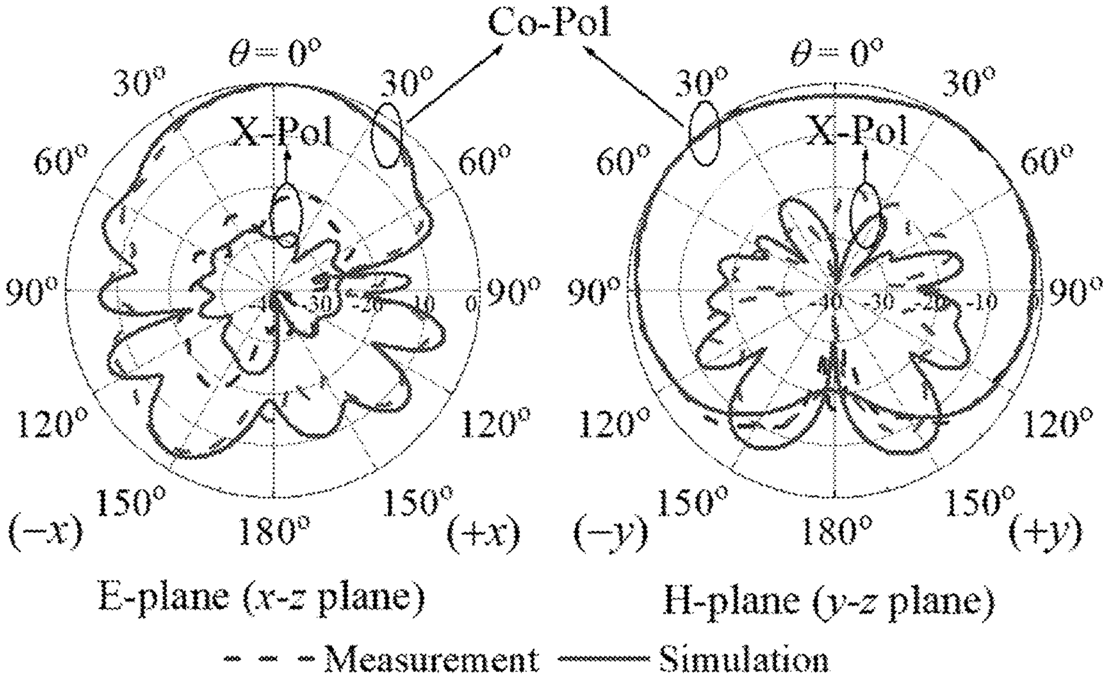
FIG. 14 shows the measured and simulated radiation patterns of the element prototype at 8.6 GHz.

FIG. 14 shows the measured and simulated radiation patterns of the element prototype at 8.6 GHz. The H-plane 3-dB beamwidth of the co-polarized pattern is very wide, with the measured and simulated values given by 217° and 218°, respectively. It can be found from the figure that the E- and H-plane cross-polar levels are less than the co-polar counterparts by at least 15 dB within their respective 3-dB beamwidths.

In various embodiments, a low-profile multi-slot linear phased array antenna is provided. The multi-slot antenna 100B as afore-mentioned can applied to a design for a linear H-plane phased array with the same type of PCB (i.e., single dielectric layer structure). It is worth mentioning that the antenna array's scanning range may be reduced when installed on a large metal plate, such as the roof of a vehicle.

Figure 15A:
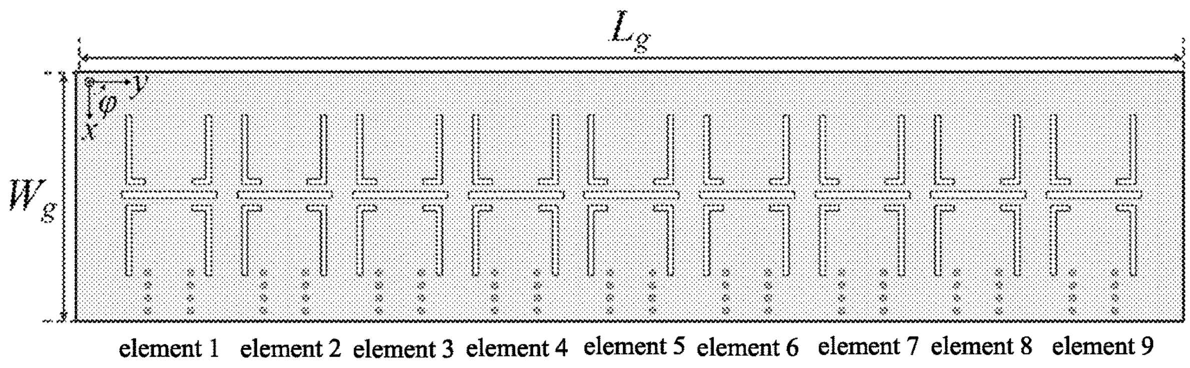
FIG. 15A and FIG. 15B respectively depict a schematic top view and a bottom view of an antenna array according to one embodiment of the present invention.
Figure 15B:
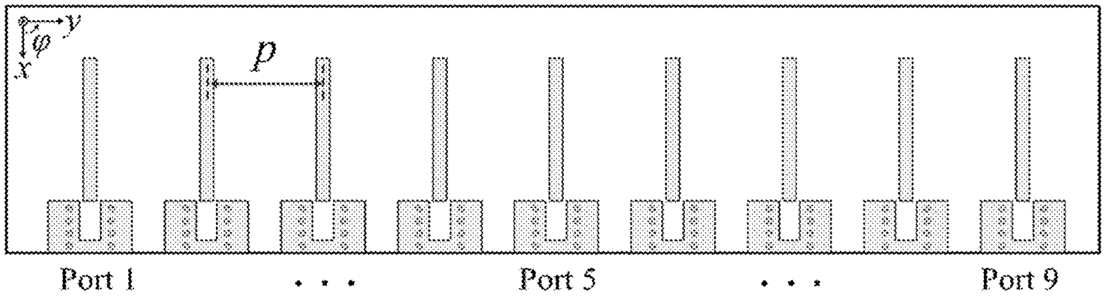

FIG. 15A and FIG. 15B respectively depict a schematic top view and a bottom view of an antenna array 200 according to one embodiment of the present invention. The configuration or structure of an antenna array 200 can apply that of the multi-slot antenna 100B, forming a configuration of the antenna array 200 with an inter-element spacing of p=0.46 $\lambda_0$, a length of $L_g$, and a width of $W_g$. The antenna array 200 may be designed at the same frequency of the antenna element as the multi-slot antenna 100B. In some embodiments, the dimension parameters of the unit multi-slot antenna (e.g., the multi-slot antenna 100B) are varied to become different than those as afore-described. For example, TABLE II lists the optimized design parameters when forming the antenna array 200, in which those parameter references are corresponding to the previous TABLE I.

TABLE II

| Parameter | Value (mm) | Parameter | Value (mm) |
|---|---|---|---|
| $L_g$ | 160 | $L_1$ | 8 |
| $L_{s1}$ | 14.4 | $L_{s2}$ | 10.75 |
| $L_{s3}$ | 0.8 | $W_g$ | 30 |
| $W_1$ | 1.82 | $W_{s1}$ | 0.2 |
| $W_{s2}$ | 0.2 | gap | 1.5 |
| p | 16 | | |

In the antenna array 200, the unit multi-slot antennas (e.g., the multi-slot antenna 100B) can be continuously arranged along a horizontal direction so they share the same substrate (e.g., a ground plane). In one embodiment, the listed parameters in TABLE 2 are applied to the antenna array 200 with nine unit multi-slot antennas. That is, the listed parameters in TABLE 2 are made for the condition that the antenna array 200 is formed by using nine unit multi-slot antennas.

Figure 16:
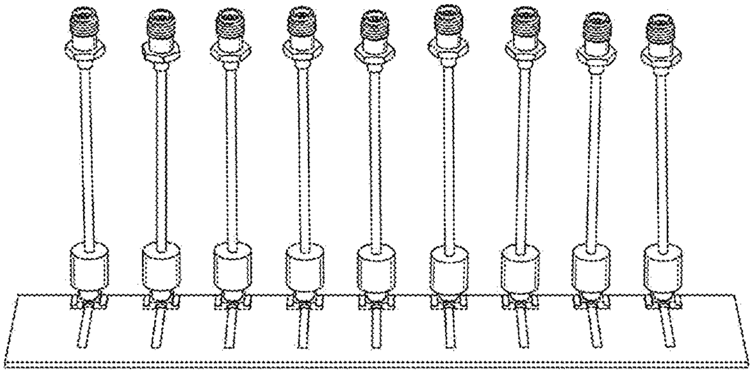
FIG. 16 depicts photos of multi-slot phased array prototype, in which the section (a) refers to a perspective view; the section (b) refers to a top view; and the section (c) refers to measurement setup in one anechoic chamber.
Figure 16:
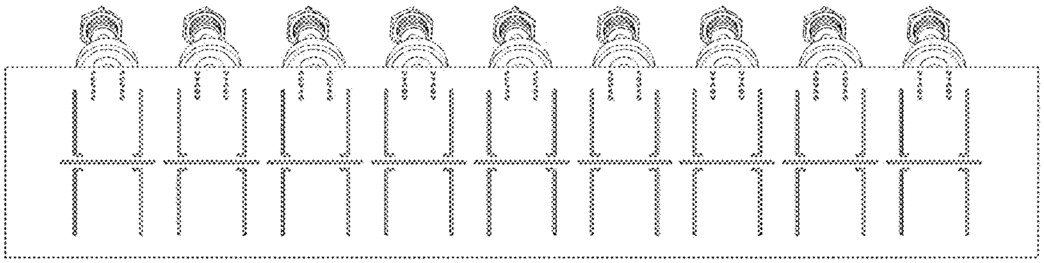
Figure 16:
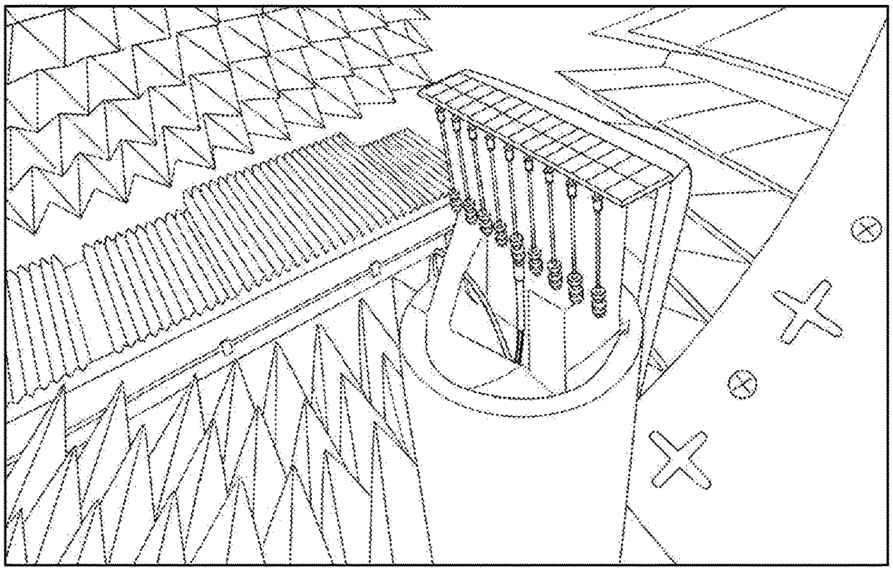

The experimental results and discussion for the antenna array are provided as follows. FIG. 16 depicts photos of multi-slot phased array prototype, in which the section (a) refers to a perspective view; the section (b) refers to a top view; and the section (c) refers to measurement setup in one anechoic chamber. FIG. 16 shows the photos of the array prototype and measurement setup. RF chokes are used in the array to avoid undesirable current flows on the surfaces of the cables.

Figure 17:
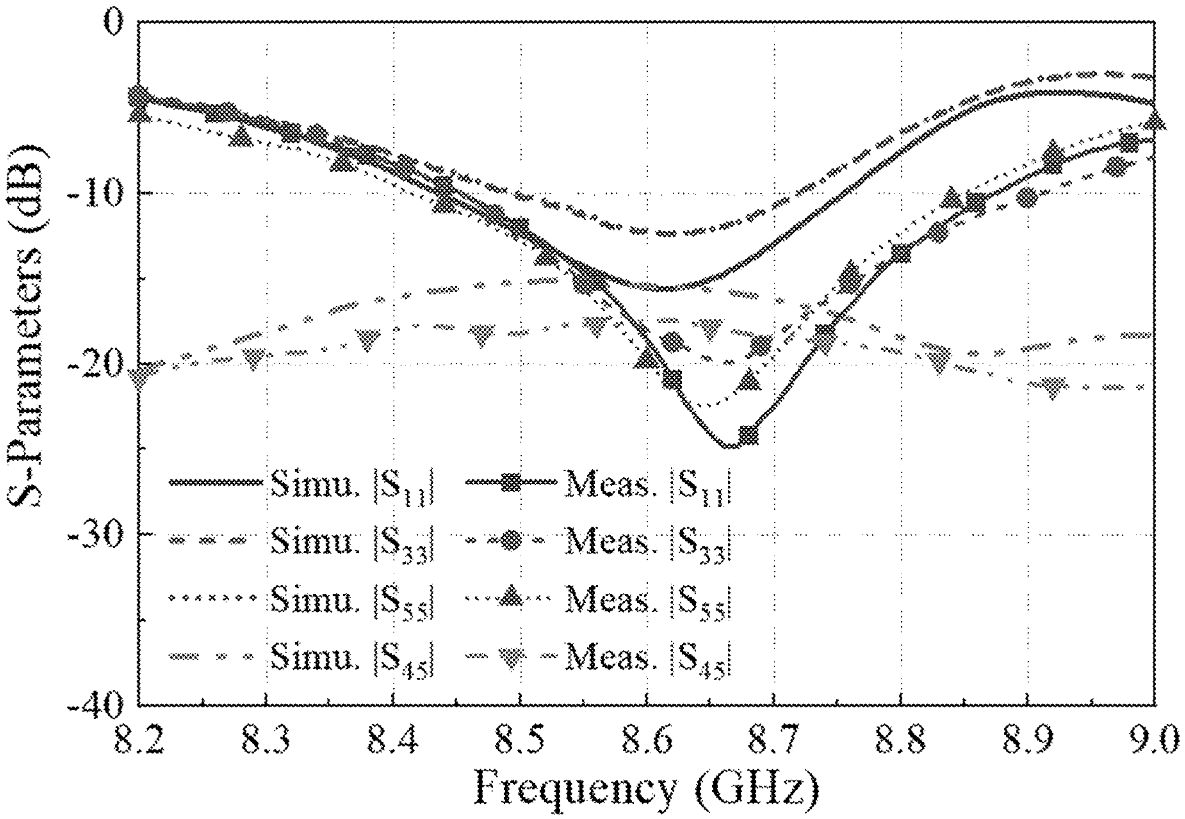
FIG. 17 illustrates the measured and simulated reflection coefficients of elements 1, 3, and 5, along with the isolation between elements 4 and 5 (i.e., measured and simulated $|S_{11}|$, $|S_{33}|$, $|S_{55}|$, and $|S_{45}|$ of the multi-slot phased array antenna)

The reflection coefficient of the antenna array is studied first. Since the array is symmetric, only the leftmost element (element 1), the center element (element 5), and the element between them (element 3) are discussed. FIG. 17 illustrates the measured and simulated reflection coefficients of elements 1, 3, and 5, along with the isolation between elements 4 and 5 (i.e., measured and simulated $|S_{11}|$, $|S_{33}|$, $|S_{55}]$, and $|S_{45}|$ of the multi-slot phased array antenna). The measured and simulated overlapping 10-dB bandwidths of the three elements are 4.4% (8.46-8.84 GHZ) and 2.6% (8.5-8.72 GHz), respectively. Also, the measured and simulated $|S_{45}|$ are all lower than −15 dB across the concerned bandwidth. As compared with the simulated result, the measured result has an upward frequency shift of 0.5%, which is attributed to fabrication and assembly errors.

In practice, the active reflection coefficient is a better indicator for evaluating impedance match in beam steering. Here, elements 1, 5, and 9 of the array are considered because the active reflection coefficients of the array are no longer symmetric; the leftmost and rightmost elements generally have unequal reflection coefficients at different steering angles. The active reflection coefficient at the m-th element can be computed as follows:

$$\Gamma_m(\theta) = e^{jkmd\sin\theta}\sum_{n=1}^{N} S_{mn}\, e^{-jknd\sin\theta} \qquad \text{equation (2)}$$

where $S_{mn}$, k, d, and θ are the passive S-parameter, wavenumber, inter-element spacing, and scan angle, respectively. Equation (2) is used to calculate the active reflection coefficients at various scan angles for each element.

Figure 18:
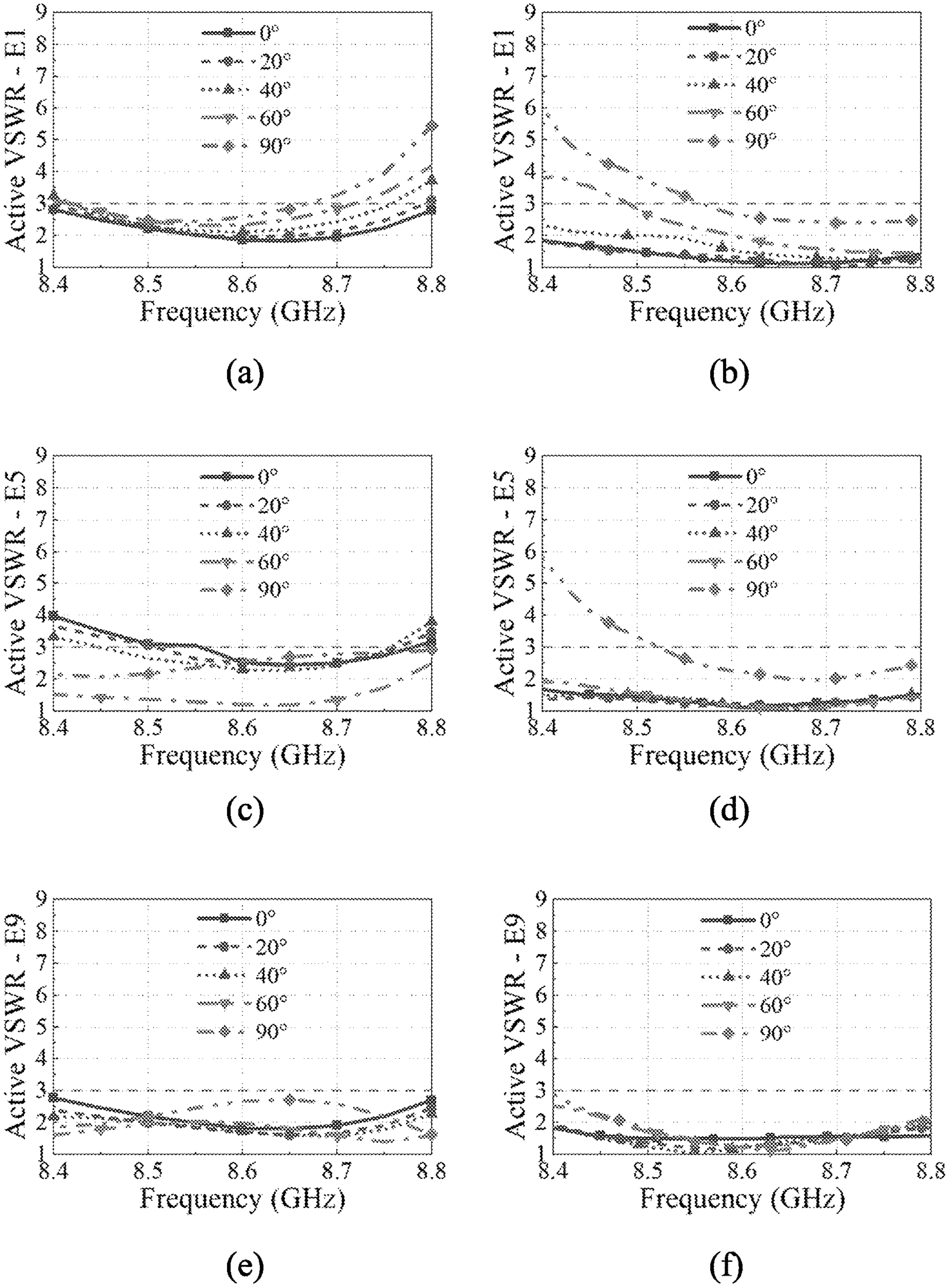
FIG. 18 depicts measured and simulated active VSWRs, in which the section (a) refers to simulation of element 1; the section (b) refers to measurement of element 1; the section (c) refers to simulation of element 5; the section (d) refers to measurement of element 5; the section (e) refers to simulation of element 9; and the section (f) refers to measurement of element 9.

FIG. 18 depicts measured and simulated active VSWRs, in which the section (a) refers to simulation of element 1; the section (b) refers to measurement of element 1; the section (c) refers to simulation of element 5; the section (d) refers to measurement of element 5; the section (e) refers to simulation of element 9; and the section (f) refers to measurement of element 9. FIG. 18 shows the experimental active voltage standing wave ratios (VSWRs) of elements 1, 5, and 9 at different scanning angles, with the discrepancy caused by experimental imperfections. The illustration shows that the active VSWR tends to degrade at large steering angles because of the strong mutual couplings between the array elements. At the center frequency (8.6 GHz), it can be found that the active VSWRs of the three elements are all less than 3.

For a linear array with uniform amplitude and spacing, the required progressive phase β for a specific main beam direction θ is defined by:

$$\beta = -kd\sin\theta \qquad \text{equation (3)}$$

Thus, the theoretical progressive phases of our phased array for various scanning angles can be calculated by equation (3). Table III compares the theoretical and designed phase differences of our phased array at 8.6 GHz. The designed phase differences are optimized by shifting the simulated main beam to the desired angles using ANSYS HFSS. As can be observed from TABLE III, there is a small deviation between the theoretical and designed phase differences at large scan angles. This is because the multi-slot array of the present invention is a finite small array. Generally, the main beam direction of a phased array is also affected by the number of array elements when the array size is small.

TABLE III

Comparison Between Theoretical and Designed Phase Differences for Different Scanning Angles

| Main beam angle | | 0° | 20° | 40° | 60° | 90° |
|---|---|---|---|---|---|---|
| Required phase differences β (°) | Theoretical | 0 | −56 | −106 | −143 | −165 |
| | Designed | 0 | −56 | −105 | −140 | −163 |

For the multi-slot array of the present invention, the measured beam-steering performance is obtained by using the unit-excitation active element pattern (AEP) method. In this method, the fully excited phased array radiation pattern is expressed using a superposition of the element radiation patterns as follows:

$$E(\theta, \phi) = \sum_{q=1}^{N} V_q g_u^q(\theta, \phi) \qquad \text{equation (4)}$$

where $V_q$ is the complex-valued feed voltage and $$g_u^q(\theta, \Phi)$$

is the field produced by the qth unit-excitation current distribution component, called the unit-excitation AEP.

Equation (4) indicates that the array pattern can be synthesized for any set of complex feed signals from a set of the measured AEPs, which contains all the mutual coupling effects. The measured AEP is obtained by exciting one element and terminating the remaining elements with loads. By exciting the array elements of the present invention one by one with the same amplitude and phase, nine measured AEPs were obtained. Next, by introducing the designed progressive phases (listed in Table III) and uniform amplitude to the measured AEPs in post-processing, the measured beam-steering performance of our phased array can be obtained by using equation (4).

Figure 19:
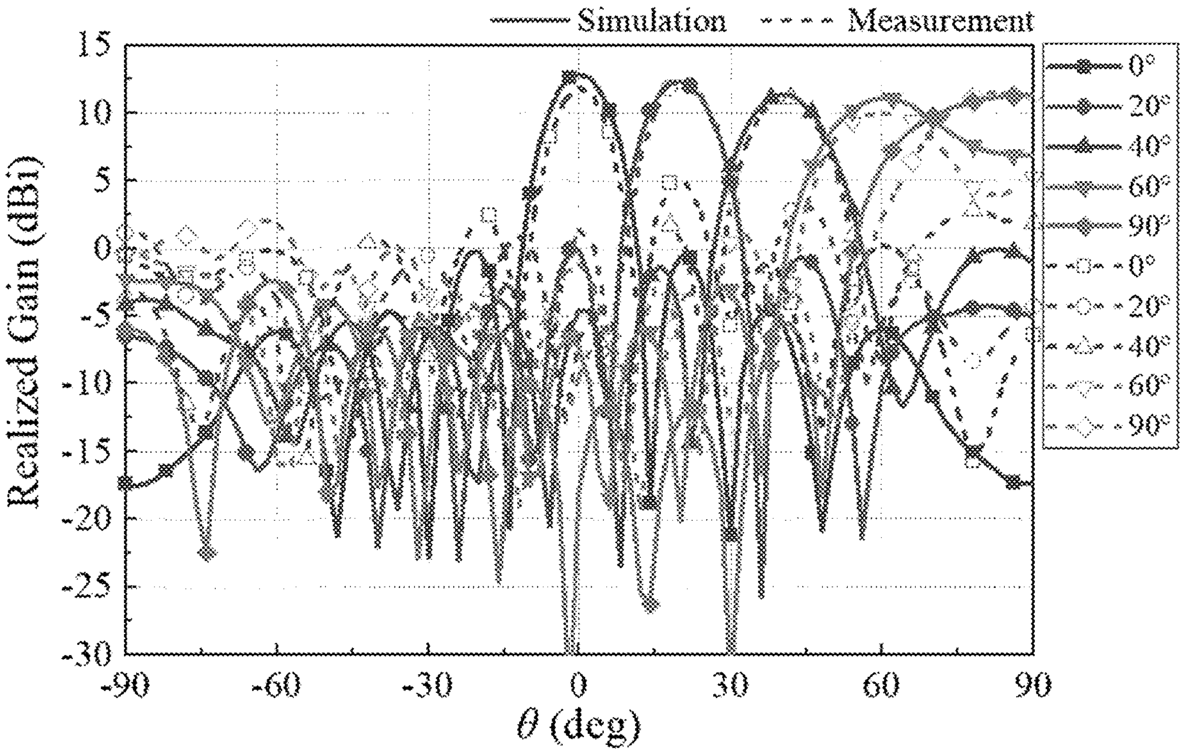
FIG. 19 depicts measured and simulated beam-steering performance of multi-slot phased array in the H-plane at 8.6 GHz.

FIG. 19 depicts measured and simulated beam-steering performance of multi-slot phased array in the H-plane at 8.6 GHz. It confirms the beam-steering capability of our H-plane multi-slot phased array at 8.6 GHz. Since the array structure is symmetric, only the positive scan range is given here for brevity. It can be found from the figure that both the measured and simulated main beams can steer from 0° to +90°. The measured and simulated peak realized gains are 12.1 dBi and 12.9 dBi, respectively. Across the scan range (0° to ±90°, the measured and simulated gain fluctuations are 2.1 dB and 1.8 dB, respectively, with their respective maximum sidelobe levels (SLLs) being less than −5 dB and −11.4 dB. The discrepancy between the simulated and measured results is mainly caused by the fabrication and experimental tolerance, such as cable fabrication error, different choke positions on the cables, and deformation of the PCB during the measurement.

In addition, it can be observed from the figure that the beamwidth of main beam is gradually getting wider as the scanning angle increases. This phenomenon should be interpreted from two aspects. On the one hand, for a uniformly excited linear phased array, the beamwidth of array factor will increase as the main beam steers off broadside, especially when approaching the endfire direction. On the other hand, our multi-slot antenna element has a very wide measured 3-dB beamwidth of 217°, completely covering the upper half space. According to the principle of pattern multiplication, this wide-beam element radiation pattern will have an almost negligible impact on the main beam of array radiation pattern. Thus, the beamwidth characteristics of the steered array patterns should be similar to those of the array factor.

FIG. 20 shows a table for comparing the array design of the present invention with reported wide-angle beam-steering linear phased arrays. As can be observed from the table, the multi-slot array antenna of the present invention exhibits a moderate level of bandwidth characteristics. However, the array design of the present invention remains competitive due to its ability to steer the main beam in the upper half space with a low profile. Furthermore, the multi-slot array antenna of the present invention is fabricated using low-cost PCB technology.

As discussed above, a beam-broadening technique that deploys a hybrid magnetic current is provided. The provided devices have been utilized to build a wide-beamwidth, low-profile multi-slot antenna element. It has been shown that the equivalent magnetic currents of the multi-slot element can be regarded as a combination of MC1 and MC2. By changing the short arm length of the L-shaped slot, the beam of H-plane radiation pattern can be flexibly tuned. The proposed wide-beam multi-slot antenna has a very wide H-plane beamwidth of 217°.

The wide-beamwidth antenna element has been used to design a linear multi-slot phased array with wide steering range. It has an H-plane scan range of ±90°. A measured gain fluctuation of only 2.1 dB has been found across this scanning range, with the maximum SLL being less than −5 dB. As compared with reported phased array antennas, the provided design of the present invention is highly competitive in both its scan range and physical profile. Thus, it can be applied to vehicular communications well.

The functional units and modules of the apparatuses and methods in accordance with the embodiments disclosed herein may be implemented using computing devices, computer processors, or electronic circuitries including but not limited to application specific integrated circuits (ASIC), field programmable gate arrays (FPGA), microcontrollers, and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the methods in accordance to the embodiments may be executed in one or more computing devices including server computers, personal computers, laptop computers, mobile computing devices such as smartphones and tablet computers.

The embodiments may include computer storage media, transient and non-transient memory devices having computer instructions or software codes stored therein, which can be used to program or configure the computing devices, computer processors, or electronic circuitries to perform any of the processes of the present invention. The storage media, transient and non-transient memory devices can include, but are not limited to, floppy disks, optical discs, Blu-ray Disc, DVDs, CD-ROMs, and magneto-optical disks, ROMs, RAMs, flash memory devices, or any type of media or devices suitable for storing instructions, codes, and/or data.

Each of the functional units and modules in accordance with various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A multi-slot antenna, comprising:

a ground plane;

a driven slot positioned on the ground plane and extending along a first direction;

a first parasitic slot positioned on the ground plane and at a first side of the driven slot, wherein the first parasitic slot extends along the first direction and a second direction different than the first direction;

a second parasitic slot positioned on the ground plane and at the first side of the driven slot, wherein the second parasitic slot extends along the first direction and the second direction;

a third parasitic slot positioned on the ground plane and at a second side of the driven slot opposite the first side, wherein a first end of the driven slot is located between the first parasitic slot and the third parasitic slot, and the third parasitic slot at least extends along the first direction and the second direction, and wherein the first parasitic slot and the third parasitic slot are symmetrical about the driven slot; and a fourth parasitic slot positioned on the ground plane and at the second side of the driven slot, wherein a second end of the driven slot is opposite the first end and located between the second parasitic slot and the fourth parasitic slot, and the fourth parasitic slot at least extends along the first direction and the second direction, and wherein the second parasitic slot and the fourth parasitic slot are symmetrical about the driven slot;

wherein each of the first parasitic slot, the second parasitic slot, the third parasitic slot, and the fourth parasitic slot presents an L-shape by extending along the first direction and the second direction and comprises:

a first extending portion extending along the first direction; and a second extending portion connected to the first extending portion and extending along the second direction, wherein the first extending portion is shorter than the second extending portion;

wherein the first extending portion of the first parasitic slot and the first extending portion of the second parasitic slot are located between the second extending portion of the first parasitic slot and the second extending portion of the second parasitic slot.

2. The multi-slot antenna of claim 1, wherein the first extending portion of each of the first parasitic slot, the second parasitic slot, the third parasitic slot, and the fourth parasitic slot has a length along the first direction in a range from 1 mm to 1.5 mm.

3. The multi-slot antenna of claim 1, wherein the second extending portion of each of the first parasitic slot, the second parasitic slot, the third parasitic slot, and the fourth parasitic slot has length along the second direction in a range from 5 mm to 15 mm, and wherein the second extending portion of each of the first parasitic slot, the second parasitic slot, the third parasitic slot, and the fourth parasitic slot has a width along the first direction in a range from 0.1 mm to 0.3 mm.

4. The multi-slot antenna of claim 1, wherein the first parasitic slot is separated from the driven slot by a gap in a range from 0.5 mm to 1.5 mm.

5. The multi-slot antenna of claim 1, wherein the first extending portion of each of the first parasitic slot, the second parasitic slot, the third parasitic slot, and the fourth parasitic slot is closer to the driven slot than an end of the second extending portion of each of the first parasitic slot, the second parasitic slot, the third parasitic slot, and the fourth parasitic slot.

6. The multi-slot antenna of claim 1, wherein the driven slot has a length along the first direction in a range from 10 mm to 15 mm and a width along the second direction in a range from 0.15 mm to 0.25 mm.

7. A multi-slot antenna array, comprising:

a plurality of multi-slot antennas according to the multi-slot antenna of claim 1, wherein the multi-slot antennas are continuously arranged along a horizontal direction.

8. The multi-slot antenna array of claim 7, wherein the number of the multi-slot antennas is nine.

9. The multi-slot antenna array of claim 8, wherein the multi-slot antenna array is symmetric.

10. The multi-slot antenna array of claim 9, wherein the multi-slot antennas include a center multi-slot antenna and four pairs of multi-slot antennas disposed on opposite sides of the center multi-slot antenna, and each pair of the four pairs of multi-slot antennas is symmetrically positioned with respect to the center multi-slot antenna.

11. The multi-slot antenna array of claim 7, wherein the first extending portion of each of the first parasitic slot, the second parasitic slot, the third parasitic slot, and the fourth parasitic slot is closer to the driven slot than an end of the second extending portion of each of the first parasitic slot, the second parasitic slot, the third parasitic slot, and the fourth parasitic slot.

12. The multi-slot antenna of claim 1, wherein the first extending portion of the first parasitic slot extends from the second extending portion of the first parasitic slot toward the second parasitic slot.

13. The multi-slot antenna of claim 12, wherein the first extending portion of the second parasitic slot extends from the second extending portion of the second parasitic slot toward the first parasitic slot.

14. The multi-slot antenna of claim 1, wherein a vertical distance between the first extending portion of the first parasitic slot and the first extending portion of the third parasitic slot is less than a vertical distance between two opposite ends of the second extending portion of the first parasitic slot and the second extending portion of the third parasitic slot.

15. The multi-slot antenna of claim 14, wherein a vertical distance between the first extending portion of the second parasitic slot and the first extending portion of the fourth parasitic slot is less than a vertical distance between two opposite ends of the second extending portion of the second parasitic slot and the second extending portion of the fourth parasitic slot.

16. The multi-slot antenna of claim 1, wherein the first parasitic slot is separated from the driven slot by a first gap less than a length of the second extending portion of the first parasitic slot.

17. The multi-slot antenna of claim 16, wherein the second parasitic slot is separated from the driven slot by a second gap less than a length of the second extending portion of the second parasitic slot.

18. The multi-slot antenna of claim 17, wherein the third parasitic slot is separated from the driven slot by a third gap less than a length of the second extending portion of the third parasitic slot.

19. The multi-slot antenna of claim 18, wherein the fourth parasitic slot is separated from the driven slot by a fourth gap less than a length of the second extending portion of the fourth parasitic slot.

* * * * *